US012756466B2

(12) United States Patent
Wei et al.

(10) Patent No.: US 12,756,466 B2
(45) Date of Patent: Oct. 6, 2026

(54) TECHNIQUES FOR VISIBLE LIGHT COMMUNICATION-ASSISTED BROADCAST TRANSMISSIONS

(71) Applicant: QUALCOMM Incorporated, San Diego, CA (US)

(72) Inventors: Chao Wei, Beijing (CN); Hao Xu, Beijing (CN); Kangqi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 18/570,288

(22) PCT Filed: Aug. 13, 2021

(86) PCT No.: PCT/CN2021/112387

§ 371 (c)(1),
(2) Date: Dec. 14, 2023

(87) PCT Pub. No.: WO2023/015539

PCT Pub. Date: Feb. 16, 2023

(65) Prior Publication Data

US 2024/0283535 A1 Aug. 22, 2024

(51) Int. Cl.
*H04B 10/116* (2013.01)

(52) U.S. Cl.
CPC .................................. *H04B 10/116* (2013.01)

(58) Field of Classification Search
CPC .................................................... H04B 10/116
USPC .......................................................... 398/172
See application file for complete search history.

(56) References Cited

U.S. PATENT DOCUMENTS

| | | | | |
|---|---|---|---|---|
| 8,942,564 | B2 | 1/2015 | Jovicic et al. | |
| 10,181,902 | B2 * | 1/2019 | Cregg | H04L 43/16 |
| 10,230,466 | B2 * | 3/2019 | Ryan | G01S 1/0426 |
| 2014/0029494 | A1 * | 1/2014 | Sundaram | H04W 52/0235 370/311 |

(Continued)

FOREIGN PATENT DOCUMENTS

| | | | |
|---|---|---|---|
| EP | 2918025 | A1 | 9/2015 |
| EP | 3236594 | A2 | 10/2017 |

(Continued)

OTHER PUBLICATIONS

International Search Report and Written Opinion—PCT/CN2021/112387—ISA/EPO—Jan. 31, 2022 (2105167WO1).

*Primary Examiner* — Dalzid E Singh
(74) *Attorney, Agent, or Firm* — Holland & Hart LLP

(57) ABSTRACT

Methods, systems, and devices for wireless communications are described. A user equipment (UE) may receive, from a base station, an indication that the base station supports visible light communication (VLC). The UE may deactivate a radio frequency (RF) receiver of the UE based on the indication, and may receive a VLC message at a photo detector of the UE while the RF receiver of the UE is deactivated. In some examples, the UE may activate the RF receiver based on a content of the VLC message, which may include a physical cell identifier (PCI), a UE identifier, or a system information value tag, among other examples. Accordingly, the UE may communicate with the base station using the RF receiver. The described techniques may provide for reduced power consumption at the UE, among other benefits.

27 Claims, 18 Drawing Sheets

(56) References Cited

U.S. PATENT DOCUMENTS

| | | | | |
|---|---|---|---|---|
| 2014/0126911 | A1* | 5/2014 | Jovicic .................. | H04B 10/11 398/116 |
| 2018/0198526 | A1* | 7/2018 | Mueller .................. | H04L 63/08 |

FOREIGN PATENT DOCUMENTS

| | | | |
|---|---|---|---|
| WO | WO-2014074702 | | 5/2014 |
| WO | WO-2021024441 | A1 | 2/2021 |

* cited by examiner

TECHNIQUES FOR VISIBLE LIGHT COMMUNICATION-ASSISTED BROADCAST TRANSMISSIONS

CROSS REFERENCE

The present application is a 371 national stage filing of International PCT Application No. PCT/CN2021/112387 by WEI et al. entitled "TECHNIQUES FOR VISIBLE LIGHT COMMUNICATION-ASSISTED BROADCAST TRANSMISSIONS," filed Aug. 13, 2021, which is assigned to the assignee hereof, and which is expressly incorporated by reference in its entirety herein.

FIELD OF TECHNOLOGY

The following relates to wireless communications, including techniques for visible light communication (VLC)-assisted broadcast transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE in an idle state may deactivate a radio frequency (RF) receiver to reduce power consumption at the UE. In some cases, however, the UE may periodically reactivate the RF receiver to monitor for paging messages, detect incoming calls, or acquire system information, which may increase power consumption at the UE.

SUMMARY

The described techniques relate to improved methods, systems, devices, and apparatuses that support techniques for visible light communication (VLC)-assisted broadcast transmissions. Generally, the described techniques provide for improved idle mode operations at a user equipment (UE). In accordance with the described techniques, a UE may receive an indication that a base station supports VLC. The UE may deactivate a radio frequency (RF) receiver of the UE based on receiving the indication. The UE may receive a VLC message at a photo detector of the UE based on deactivating the RF receiver, receiving the indication, or both. The UE may receive the VLC message from one or more light emitting diodes (LEDs) connected to the base station. In some examples, the UE may activate the RF receiver based on a content of the VLC message, which may include a physical cell identifier (PCI), a UE identifier, or a system information value tag, among other examples. Accordingly, the UE may communicate with the base station using the RF receiver. The described techniques may provide for reduced power consumption at the UE based on reducing a time duration for which the RF receiver of the UE is activated.

A method for wireless communications at a UE is described. The method may include receiving, from a base station, an indication that the base station supports VLC, deactivating an RF receiver of the UE based on receiving the indication, receiving a VLC message at a photo detector of the UE, activating the RF receiver of the UE based on a content of the VLC message, and communicating with the base station using the RF receiver.

An apparatus for wireless communications at a UE is described. The apparatus may include a processor, memory coupled with the processor, and instructions stored in the memory. The instructions may be executable by the processor to cause the apparatus to receive, from a base station, an indication that the base station supports VLC, deactivate an RF receiver of the UE based on receiving the indication, receive a VLC message at a photo detector of the UE, activate the RF receiver of the UE based on a content of the VLC message, and communicate with the base station using the RF receiver.

Another apparatus for wireless communications at a UE is described. The apparatus may include means for receiving, from a base station, an indication that the base station supports VLC, means for deactivating an RF receiver of the UE based on receiving the indication, means for receiving a VLC message at a photo detector of the UE, means for activating the RF receiver of the UE based on a content of the VLC message, and means for communicating with the base station using the RF receiver.

A non-transitory computer-readable medium storing code for wireless communications at a UE is described. The code may include instructions executable by a processor to receive, from a base station, an indication that the base station supports VLC, deactivate an RF receiver of the UE based on receiving the indication, receive a VLC message at a photo detector of the UE, activate the RF receiver of the UE based on a content of the VLC message, and communicate with the base station using the RF receiver.

In some examples of the method, apparatuses, and non-transitory computer-readable medium described herein, receiving the VLC message may include operations, features, means, or instructions for receiving a broadcast VLC message indicating a system information value tag, where activating the RF receiver of the UE may be based on the system information value tag.

Some examples of the method, apparatuses, and non-transitory computer-readable medium described herein may further include operations, features, means, or instructions for identifying a change in system information for the base station based on the system information value tag, where activating the RF receiver may be based on identifying the change in system information.

In some examples of the method, apparatuses, and non-transitory computer-readable medium described herein, receiving the VLC message may include operations, features, means, or instructions for receiving the VLC message indicating an identifier of the UE, where activating the RF receiver may be based on the VLC message indicating the identifier of the UE.

Some examples of the method, apparatuses, and non-transitory computer-readable medium described herein may further include operations, features, means, or instructions for identifying an incoming voice call for the UE based on the VLC message indicating the identifier of the UE, where activating the RF receiver may be based on identifying the incoming voice call.

In some examples of the method, apparatuses, and non-transitory computer-readable medium described herein, receiving the VLC message may include operations, features, means, or instructions for receiving, from a second base station, a broadcast VLC message indicating a PCI of the second base station, where activating the RF receiver of the UE may be based on the broadcast VLC message indicating the PCI of the second base station.

Some examples of the method, apparatuses, and non-transitory computer-readable medium described herein may further include operations, features, means, or instructions for performing a cell reselection procedure based on the broadcast VLC message indicating the PCI of the second base station, and establishing a radio resource control (RRC) connection with the second base station based on performing the cell reselection procedure.

In some examples of the method, apparatuses, and non-transitory computer-readable medium described herein, receiving the indication that the base station supports VLC may include operations, features, means, or instructions for receiving, from the base station, system information or RRC signaling indicating VLC assistance information for broadcast VLC messages.

Some examples of the method, apparatuses, and non-transitory computer-readable medium described herein may further include operations, features, means, or instructions for transmitting, to the base station, a capability message indicating a capability of the UE to receive broadcast VLC, where receiving the VLC message may be based on transmitting the capability message.

Some examples of the method, apparatuses, and non-transitory computer-readable medium described herein may further include operations, features, means, or instructions for receiving, from the base station and based on a capability of the UE to receive broadcast VLC, an indication of an extended discontinuous reception (DRX) cycle for the UE.

In some examples of the method, apparatuses, and non-transitory computer-readable medium described herein, receiving the VLC message may include operations, features, means, or instructions for receiving a broadcast VLC message during an inactive duration of the extended DRX cycle, where activating the RF receiver of the UE may be based on receiving the broadcast VLC message during the inactive duration of the extended DRX cycle.

In some examples of the method, apparatuses, and non-transitory computer-readable medium described herein, communicating with the base station may include operations, features, means, or instructions for receiving a downlink data message from the base station using the RF receiver.

In some examples of the method, apparatuses, and non-transitory computer-readable medium described herein, receiving the VLC message may include operations, features, means, or instructions for receiving the VLC message while the UE is in an idle state.

A method for wireless communications at a base station is described. The method may include transmitting, to a UE, an indication that the base station supports VLC, transmitting, in accordance with the indication and via one or more LEDs, a VLC message including a content that triggers activation of an RF receiver at the UE, and communicating via RF communications with the UE based on transmitting the VLC message.

An apparatus for wireless communications at a base station is described. The apparatus may include a processor, memory coupled with the processor, and instructions stored in the memory. The instructions may be executable by the processor to cause the apparatus to transmit, to a UE, an indication that the base station supports VLC, transmit, in accordance with the indication and via one or more LEDs, a VLC message including a content that triggers activation of an RF receiver at the UE, and communicate via RF communications with the UE based on transmitting the VLC message.

Another apparatus for wireless communications at a base station is described. The apparatus may include means for transmitting, to a UE, an indication that the base station supports VLC, means for transmitting, in accordance with the indication and via one or more LEDs, a VLC message including a content that triggers activation of an RF receiver at the UE, and means for communicating via RF communications with the UE based on transmitting the VLC message.

A non-transitory computer-readable medium storing code for wireless communications at a base station is described. The code may include instructions executable by a processor to transmit, to a UE, an indication that the base station supports VLC, transmit, in accordance with the indication and via one or more LEDs, a VLC message including a content that triggers activation of an RF receiver at the UE, and communicate via RF communications with the UE based on transmitting the VLC message.

In some examples of the method, apparatuses, and non-transitory computer-readable medium described herein, transmitting the VLC message may include operations, features, means, or instructions for transmitting, via the one or more LEDs, a broadcast VLC message indicating a PCI of the base station, where communicating with the UE may be based on the broadcast VLC message indicating the PCI of the base station.

Some examples of the method, apparatuses, and non-transitory computer-readable medium described herein may further include operations, features, means, or instructions for establishing a RRC connection with the UE based on the content of the VLC message, where communicating with the UE may be based on establishing the RRC connection with the UE.

In some examples of the method, apparatuses, and non-transitory computer-readable medium described herein, transmitting the VLC message may include operations, features, means, or instructions for transmitting, via the one or more LEDs, a broadcast VLC message indicating a system information value tag, where the system information value tag triggers activation of the RF receiver at the UE.

In some examples of the method, apparatuses, and non-transitory computer-readable medium described herein, transmitting the VLC message may include operations, features, means, or instructions for transmitting, via the one or more LEDs, the VLC message indicating an identifier of the UE, where the identifier of the UE triggers activation of the RF receiver at the UE.

Some examples of the method, apparatuses, and non-transitory computer-readable medium described herein may further include operations, features, means, or instructions for identifying a paging message for the UE, where transmitting the VLC message may be based on identifying the paging message.

In some examples of the method, apparatuses, and non-transitory computer-readable medium described herein, transmitting the indication that the base station supports VLC may include operations, features, means, or instructions for transmitting, to the UE, system information or RRC signaling indicating VLC assistance information for broadcast VLC messages.

Some examples of the method, apparatuses, and non-transitory computer-readable medium described herein may further include operations, features, means, or instructions for receiving, from the UE, a capability message indicating a capability of the UE to receive broadcast VLC, where transmitting the VLC message to the UE may be based on receiving the capability message from the UE.

Some examples of the method, apparatuses, and non-transitory computer-readable medium described herein may further include operations, features, means, or instructions for transmitting, to the UE and based on a capability of the UE to receive broadcast VLC, an indication of an extended DRX cycle for the UE.

In some examples of the method, apparatuses, and non-transitory computer-readable medium described herein, transmitting the VLC message may include operations, features, means, or instructions for transmitting, to the UE and via the one or more LEDs, the VLC message during an inactive duration of the extended DRX cycle.

In some examples of the method, apparatuses, and non-transitory computer-readable medium described herein, communicating with the UE may include operations, features, means, or instructions for transmitting a downlink data message to the UE based on transmitting the VLC message.

DETAILED DESCRIPTION

Figure 1:
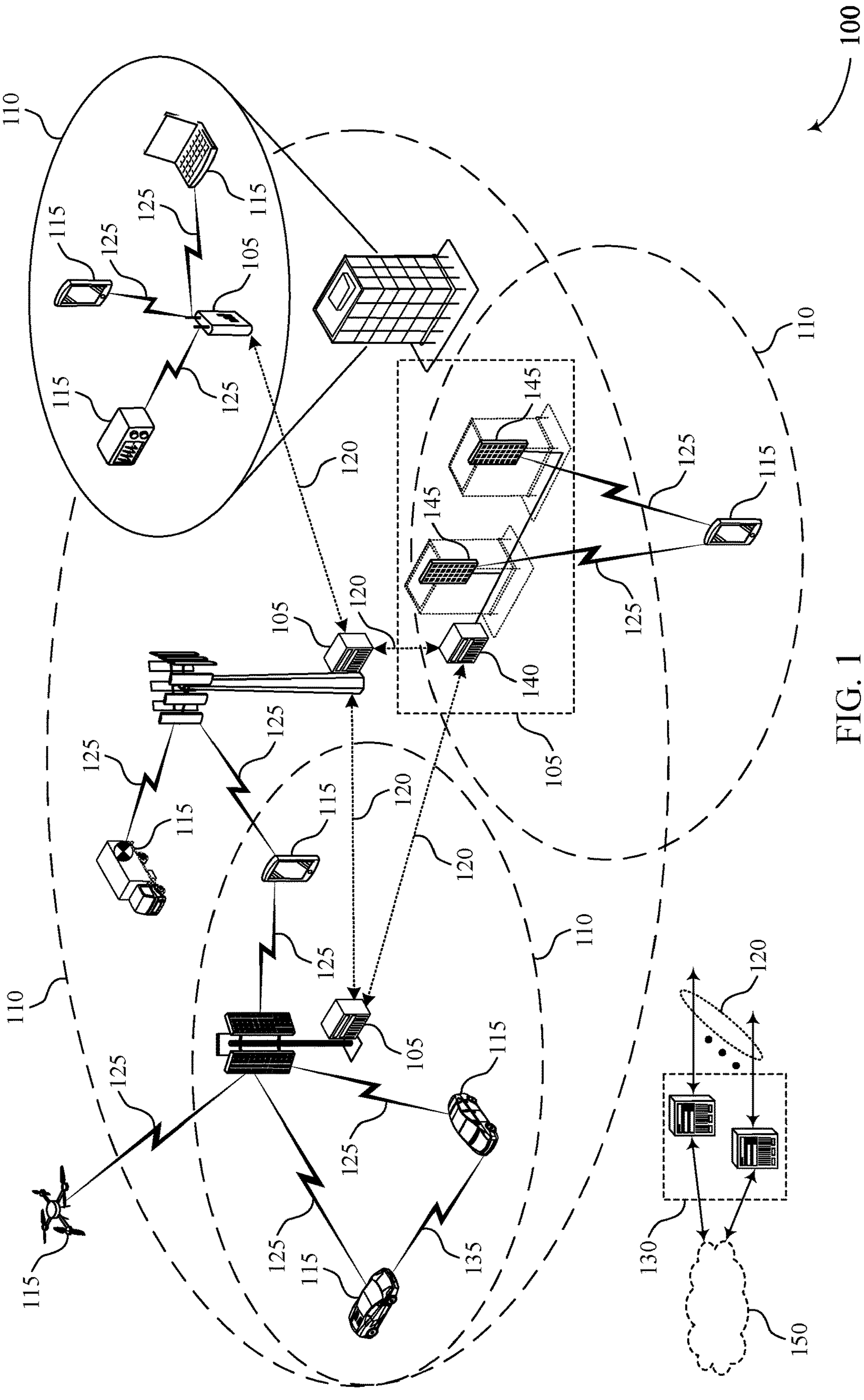
FIGS. 1 through 5 illustrate examples of wireless communications systems that support techniques for visible light communication (VLC)-assisted broadcast transmissions in accordance with aspects of the present disclosure.

In some wireless communications systems that support radio frequency (RF)-based communications such as new radio (NR) and long term evolution (LTE), a user equipment (UE) in an idle state (e.g., RRC_IDLE) may be configured to perform a number of idle mode operations. For example, the UE may be configured to monitor for paging messages, detect incoming calls, acquire system information, and perform cell selection or reselection, among other examples. These idle mode operations may result in increased power consumption at the UE. In some cases, the UE can use discontinuous reception (DRX) to reduce power consumption by switching off an RF receiver of the UE during subframes without paging occasions. Subsequently, the UE may switch the RF receiver back on during subframes with paging occasions. However, if packet activity is not high or if the UE is not scheduled to receive any paging messages in these paging occasions, switching the RF receiver back on to monitor for paging messages in each paging occasion may result in decreased power savings at the UE.

In some cases, the UE may also be configured to perform frequent neighbor cell monitoring activities (e.g., cell search and measurement procedures) while in an idle state. If, for example, the UE is in an indoor environment (e.g., where the UE is mostly stationary), these neighbor cell monitoring activities may further decrease power savings at the UE. In some cases, using a long DRX cycle or configuring the UE to receive wake up signals (WUS) during a DRX cycle (e.g., to indicate whether the UE is scheduled to receive paging messages in an upcoming paging occasion) may reduce power consumption at the UE. However, if the UE is configured with a relatively large initial bandwidth part (BWP) bandwidth, power consumption at the UE may still be relatively high.

Aspects of the present disclosure may provide for improved power savings at the UE (e.g., a UE in an idle state) based on configuring the UE to receive visible light communication (VLC)-based broadcast messages using a photo detector of the UE. As an example, the UE may receive an indication (e.g., via RF signaling) that a base station supports broadcast VLC. Accordingly, the UE may switch off an RF receiver of the UE (e.g., to conserve power) based on receiving the indication. While the RF receiver is deactivated, the UE may use a photo detector (e.g., a photo-diode or an image sensor) to monitor for broadcast VLC messages from the base station. If, for example, the UE detects a broadcast VLC message that pertains to the UE, the UE may switch the RF receiver back on to perform RF-based communications with the base station. Using a photo detector to monitor for broadcast VLC messages may be more power efficient than using an RF receiver to monitor for paging messages. As such, the described techniques may provide for greater power savings at the UE, among other benefits.

In some examples, the base station may transmit broadcast VLC messages using one or more light emitting diodes (LED) that are connected to the base station via a backhaul connection. These broadcast VLC messages may indicate a physical cell identifier (PCI) of the base station, a system information value tag pertaining to the base station, or an identifier of a specific UE. In some examples, the base station may transmit VLC assistance information to the UE via higher layer signaling such as system information or radio resource control (RRC) signaling, which may include a modulation and coding scheme (MCS) for broadcast VLC, a monitoring period for broadcast VLC, or both. In some examples, the UE may transmit VLC capability information to the base station via RF signaling, and the base station may configure the UE with an extended DRX cycle based on the VLC capability information.

Aspects of the present disclosure may be implemented to realize one or more of the following advantages. The described techniques may provide for improved idle mode operations and reduced power consumption at a UE. For example, the described techniques may enable a UE in an idle state to monitor for broadcast VLC messages using an image sensor (or another photo detector such as a photodiode) of the UE. Using a photo detector to monitor for broadcast VLC messages may enable the UE to deactivate an RF receiver of the UE for a longer duration, which may result in greater power savings at the UE, among other benefits. In addition, the described techniques may provide for configuring the UE with an extended DRX cycle for the RF receiver of the UE (e.g., based on a capability of the UE to receive broadcast VLC messages), which may further decrease power consumption at the UE.

Aspects of the disclosure are initially described in the context of wireless communications systems and process flows. Aspects of the disclosure are further illustrated by and described with reference to apparatus diagrams, system diagrams, and flowcharts that relate to techniques for VLC-assisted broadcast transmissions.

FIG. 1 illustrates an example of a wireless communications system 100 that supports techniques for VLC-assisted broadcast transmissions in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term “carrier” may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a PCI, a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems may support VLC in addition to or as an alternative to RF-based communications, especially in indoor communications. In VLC technology, data is transmitted through an LED light bulb that varies in intensity faster than a human eye can detect. The main component in a VLC receiver is a photo-detector that can detect light and produce an electrical signal that includes a message and noise. VLC receivers may employ various photo detectors, such as a photo-diode or an image sensor. For hand-held devices that are equipped with cameras (e.g., image sensors) but are not equipped with photo-diodes, configuring these devices (e.g., smartphones) to use image sensors for reception of VLC signals may be more cost effective than equipping the devices with photo-diodes.

For some wireless communications systems that support RF-based communications such as NR and LTE, a UE in RRC_IDLE may perform cell selection and reselection to determine which cell to camp on. Also, a UE in RRC_IDLE may monitor a paging channel to detect incoming calls and acquire system information. Although the UE can apply DRX (e.g., switch off an RF receiver of the UE to conserve battery power in subframes that do not include paging occasions), monitoring downlink channels in paging monitoring occasions during periods of low packet activity may reduce power savings at the UE. For indoor environments in which the UE is relatively stationary, performing frequent neighbor cell monitoring activity (e.g., cell search and measurement) may further reduce power savings at the UE. Configuring the UE with a long DRX cycle or using WUS to indicate whether the UE is scheduled to receive paging messages in an upcoming paging occasion may improve power savings at the UE. However, power consumption at the UE may still be relatively high if a bandwidth of an initial BWP configured for UEs in RRC_IDLE is relatively large (e.g., 20 MHz for FR1 and 100 MHz for FR2 in 5G NR).

Aspects of the present disclosure may provide for improved battery life at the UE based on configuring the UE to receive VLC-based broadcast data transmissions in an idle state. Specifically, aspects of the present disclosure may enable the UE to monitor for broadcast VLC messages using a photo detector of the UE. Configuring the UE to receive VLC-based broadcast transmissions in an idle state may enable the UE to deactivate an RF receiver of the UE for a longer duration, which may result in greater power savings at the UE, among other benefits. In addition, aspects of the present disclosure may provide for configuring the UE with an extended DRX cycle (e.g., based on a capability of the UE to receive broadcast VLC messages), which may further decrease power consumption at the UE.

Figure 2:
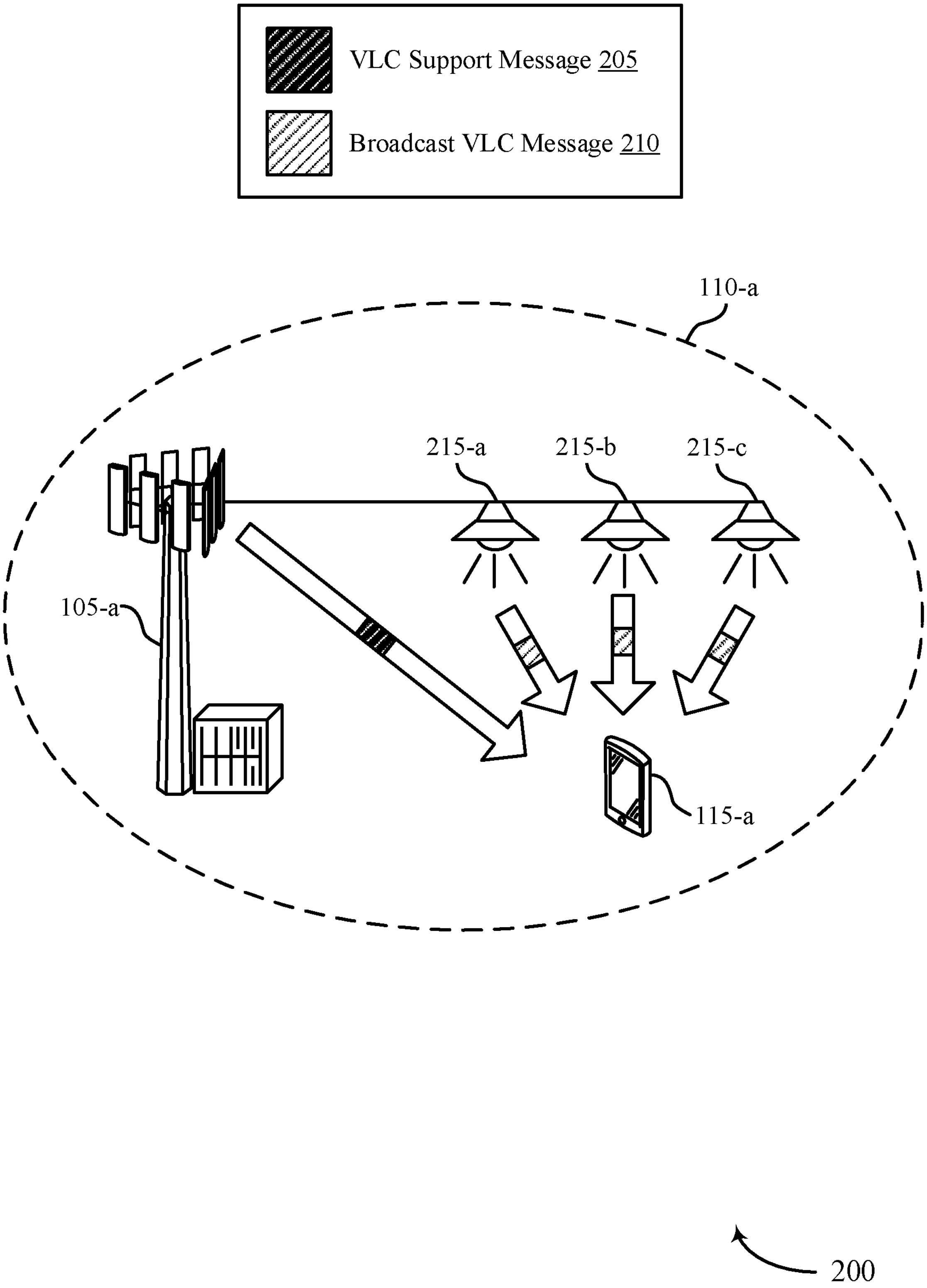

FIG. 2 illustrates an example of a wireless communications system 200 that supports techniques for VLC-assisted broadcast transmissions in accordance with aspects of the present disclosure. The wireless communications system 200 may implement or be implemented by aspects of wireless communications system 100. For example, the wireless communications system 200 may include a base station 105-*a* and a UE 115-*a*, which may be examples of corresponding devices described with reference to FIG. 1. The base station 105-*a* may communicate with the UE 115-*a* within a geographic coverage area 110-*a* of the base station 105-*a*, which may be an example of a geographic coverage area 110 described with reference to FIG. 1. In the wireless communications system 200, the base station 105-*a* may transmit a broadcast VLC message 210 to the UE 115-*a* while the UE 115-*a* is in an idle state.

The base station 105-*a* may transmit a VLC support message 205 to the UE 115-*a* via RF signaling. In some examples, the base station 105-*a* may include the VLC support message 205 in higher layer signaling, such as system information or RRC signaling. The VLC support message 205 may indicate whether the base station 105-*a* supports VLC-based broadcast transmissions. In some examples, the UE 115-*a* may deactivate an RF receiver of the UE 115-*a* based on receiving the VLC support message 205. In such examples, the UE 115-*a* may receive downlink broadcast messages from the base station 105-*a* using a type of photo detector such as an image sensor (e.g., a camera) of the UE 115-*a* instead of the RF receiver. The VLC support message 205 may also include parameters that pertain to reception of VLC signals at the UE 115-*a*. For example, the VLC support message 205 may indicate one or more physical layer (PHY) parameters, such as an MCS for VLC or a monitoring period for VLC.

In some examples, the UE 115-*a* may transmit a capability message to the base station 105-*a* in response to the VLC support message 205. In other examples, the UE 115-*a* may receive the VLC support message 205 from the base station 105-*a* in response to transmitting the capability message. That is, the base station 105-*a* may transmit the VLC support message 205 based on receiving the capability message from the UE 115-*a*. The UE 115-*a* may transmit the capability message to the base station 105-*a* via RF signaling, which may include dynamic signaling or RRC signaling, among other examples. The capability message may indicate a capability of the UE 115-*a* to receive VLC-based broadcast transmissions.

If the UE 115-*a* is capable of receiving VLC-based broadcast transmissions, the base station 105-*a* may configure the UE 115-*a* with an extended DRX cycle, which may have a duration of several minutes or longer. The extended DRX cycle (e.g., a VLC-specific DRX cycle) may be different from DRX cycles (e.g., a non-VLC-specific DRX cycle) of other UEs 115 that are configured to receive broadcast transmissions using RF receivers. During active durations (e.g., DRX ON durations) of the extended DRX cycle, the UE 115-*a* may activate the RF receiver of the UE 115-*a* to monitor paging channels, detect incoming calls, and perform measurements for cell reselection. The active durations of the extended DRX cycle may be shorter than or the same length as the active durations of DRX cycles of other UEs 115 that are configured to received broadcast transmission using RF receivers. During inactive durations (e.g., DRX OFF durations) of the extended DRX cycle, the UE 115-*a* may deactivate the RF receiver and may instead use a photo detector (e.g., an image sensor) of the UE 115-*a* to receive downlink VLC-based broadcast transmissions from one or more LEDs 215 that are connected to the base station 105-*a* via a backhaul connection. The inactive durations of the extended DRX cycle may be longer than the inactive durations of DRX cycles of other UEs 115 that are configured to received broadcast transmission using RF receivers. Configuring the UE 115-*a* with an extended DRX cycle may decrease power consumption at the UE 115-*a* by reducing the time for which the RF receiver of the UE 115-*a* is active, and may also reduce the likelihood of the UE 115-*a* losing service from the base station 105-*a* (e.g., the serving cell for the UE 115-*a*) when the UE 115-*a* is unable to receive VLC signals from the LEDs 215 (e.g., due to blockage or an orientation of the UE 115-*a* with respect to the LEDs 215).

The base station 105-*a* may transmit a broadcast VLC message 210 (equivalently referred to herein as a VLC-based broadcast data transmission) to the UE 115-*a* in accordance with the VLC support message 205. The base station 105-*a* may transmit the broadcast VLC message 210 using one or more LEDs 215 that are connected to the base station 105-*a* via a backhaul connection. For example, the base station 105-*a* may transmit the broadcast VLC message 210 to the UE 115-*a* via an LED 215-*a*, an LED 215-*b*, and an LED 215-*c*. In some examples, the base station 105-*a* may use an MCS to modulate the broadcast VLC message 210 prior to transmission. Accordingly, the UE 115-*a* may use the MCS to demodulate and process the broadcast VLC message 210 (e.g., to decode the broadcast VLC message 210).

An example of PHY parameters for VLC transmission based on IEEE standards for VLC is shown in Table 1, where color shift keying (CSK) refers to a particular modulation format for visible light. However, it is to be understood that other modulation formats, such as on-off keying (OOK) or variable pulse-position modulation (VPPM) may also be supported for VLC. Forward error correction (FEC) may refer to a technique for detecting and correcting transmission errors, and Reed-Solomon (RS) may refer to a code-based FEC technique that can be applied to VLC. Specifically, RS (64, 32) may refer to a code-based FEC technique that uses a codeword with 64 code word bytes, of which 32 bytes are for data and 32 bytes are for parity. An optical clock rate may refer to an operating frequency (e.g., in MHz) of an optical clock at the UE 115-*a*, and a data rate may refer to a rate (e.g., in megabits per second (Mb/s)) at which data can be communicated using VLC signaling.

TABLE 1

PHY parameters for VLC transmission

| Modulation | Optical clock rate | FEC | Data rate |
|---|---|---|---|
| 4-CSK | 12 MHz | RS (64, 32) | 12 Mb/s |
| 8-CSK | | RS (64, 32) | 18 Mb/s |
| 4-CSK | 24 MHz | RS (64, 32) | 24 Mb/s |
| 8-CSK | | RS (64, 32) | 36 Mb/s |
| 16-CSK | | RS (64, 32) | 48 Mb/s |
| 8-CSK | | None | 72 Mb/s |
| 16-CSK | | None | 96 Mb/s |

As described with reference to FIGS. 3 through 5, the broadcast VLC message 210 may indicate a PCI of the base station 105-*a*, a system information value tag corresponding to the base station 105-*a*, or an identifier of the UE 115-*a* (among other examples). In some examples, the broadcast VLC message 210 may indicate a change of system information in an associated cell (e.g., a cell associated with the base station 105-*a*). In some examples, the broadcast VLC message 210 may indicate an incoming call for the UE 115-*a*. In other examples, the UE 115-*a* may indicate that the UE 115-*a* has entered a different coverage area (e.g., if the broadcast VLC message 210 indicates a PCI of a different cell). Configuring the UE 115-*a* to receive VLC-based broadcast transmissions from the base station 105-*a* in accordance with aspects of the present disclosure may reduce idle mode power consumption at the UE 115-*a*, among other benefits.

Figure 3:
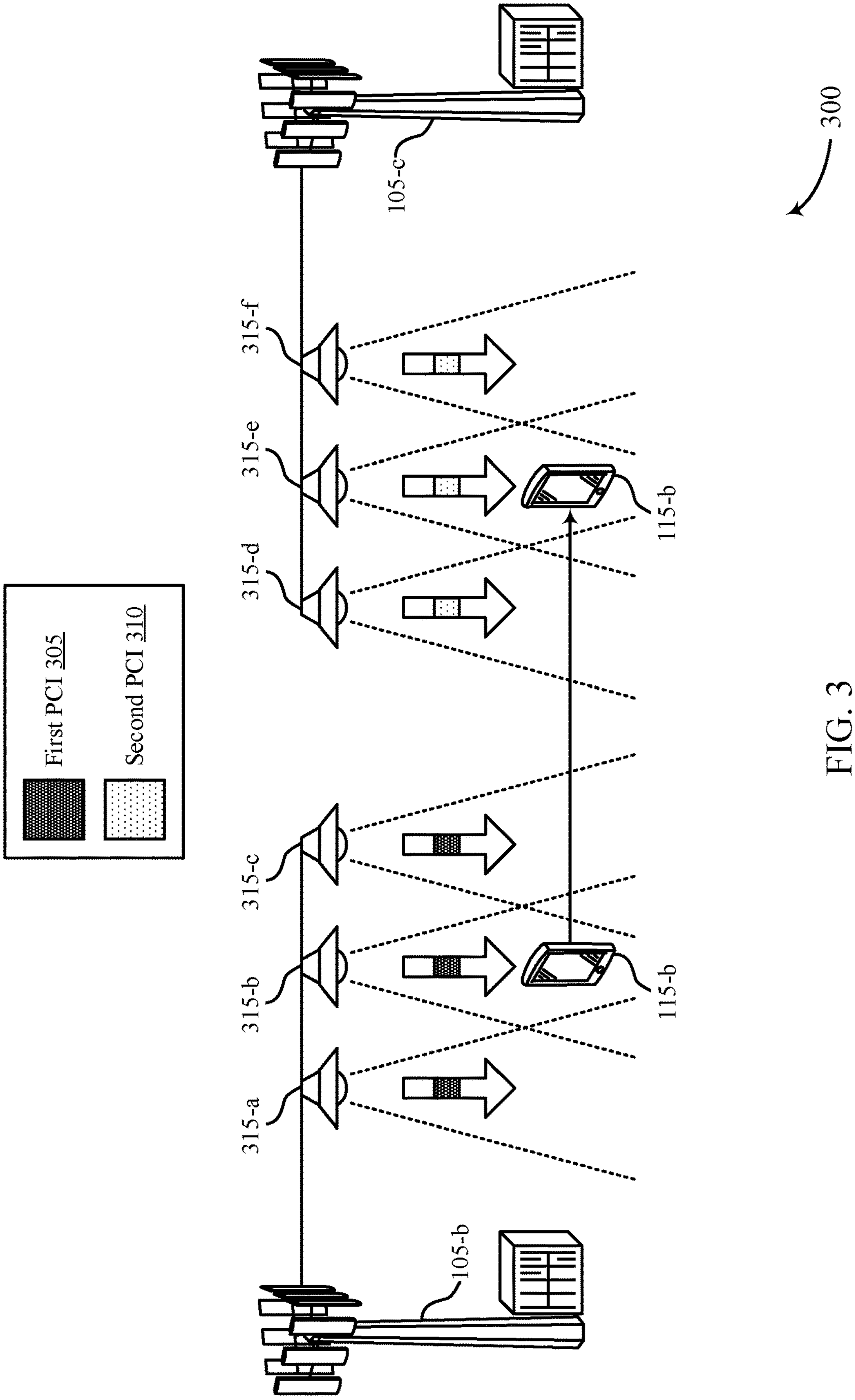

FIG. 3 illustrates an example of a wireless communications system 300 that supports techniques for VLC-assisted broadcast transmissions in accordance with aspects of the present disclosure. The wireless communications system 300 may implement or be implemented by aspects of the wireless communications system 100 or the wireless communications system 200. For example, the wireless communications system 300 may include a base station 105-*b*, a base station 105-*c*, and a UE 115-*b*, which may be examples of corresponding devices described with reference to FIGS. 1 and 2. The wireless communications system 300 may also include LEDs 315, which may be examples of LEDs 215 described with reference to FIG. 2. In the wireless communications system 300, the UE 115-*b* may perform a cell reselection procedure based on receiving broadcast VLC messages from the base stations 105.

As described with reference to FIGS. 1 and 2, the base stations 105 may transmit VLC support information to the UE 115-*b* (e.g., via higher layer RF signaling, such as system information or RRC signaling). The VLC support information may indicate whether the base stations 105 support VLC-based broadcast transmissions. The VLC support information may also indicate an MCS for VLC, a monitoring period for VLC, or both. In some examples, the UE 115-*b* may transmit VLC capability information to the base stations 105 (e.g., via RF signaling) based on receiving the VLC support information from the base stations 105. In other examples, the UE 115-*b* may transmit the VLC capability information based on receiving the VLC support information. That is, the base stations 105 may transmit the VLC support information based on receiving the VLC capability information from the UE 115-*b*. The VLC capability information may indicate a capability of the UE 115-*b* to receive VLC-based broadcast transmissions. In some examples, the base stations 105 may configure the UE 115-*b* with a VLC-specific DRX cycle (e.g., an extended DRX cycle) based on receiving the VLC capability information from the UE 115-*b*.

If, for example, the UE 115-*b* determines that the base stations 105 support VLC-based broadcast transmissions and the UE 115-*b* is capable of receiving such VLC-based broadcast transmissions, the UE 115-*b* may deactivate an RF receiver of the UE 115-*b* (e.g., the UE 115-*b* may enter an idle state). Accordingly, the UE 115-*b* may use a photo detector (e.g., an image sensor) of the UE 115-*b* to monitor for broadcast VLC messages from the base stations 105. Each of the base stations 105 may be connected to LEDs 315, which can be utilized to transmit assistance information to the UE 115-*b* for receiving downlink broadcast transmissions. For example, the base station 105-*b* may be connected to an LED 315-*a*, an LED 315-*b*, and an LED 315-*c*, and the base station 105-*c* may be connected to an LED 315-*d*, an LED 315-*e*, and an LED 315-*f*.

In the example of FIG. 3, the LEDs 315 may operate as beacons that repeatedly transmit identification codes (e.g., PCIs) of the base stations 105 to assist the UE 115-*b* with cell reselection. As an example, if the base station 105-*b* is associated with a first PCI 305 and the UE 115-*b* receives a broadcast VLC message indicating the first PCI 305, the UE 115-*b* may determine that the UE 115-*b* is in a coverage area of the base station 105-*b*. Alternatively, if the base station 105-*c* is associated with a second PCI 310 and the UE 115-*b* receives a broadcast VLC message indicating the second PCI 310, the UE 115-*b* may determine that the UE 115-*b* is in a coverage area of the base station 105-*c*. If, for example, the UE 115-*b* was previously connected to the base station 105-*b* (e.g., prior to entering an idle mode and deactivating an RF receiver of the UE 115-*b*) and the UE 115-*b* receives a broadcast VLC message indicating the second PCI 310, the UE 115-*b* may determine that the UE 115-*b* has moved into a coverage area of a different cell (e.g., the base station 105-*c*). Accordingly, the UE 115-*b* may activate an RF receiver of the UE 115-*b* to perform a cell reselection procedure. In some examples, the UE 115-*b* may connect with the base station 105-*c* as a result of the cell reselection procedure.

The wireless communications system 300 may support techniques for improved idle mode operations and reduced power consumption at the UE 115-*b*. For example, the described techniques may enable the UE 115-*b* to receive VLC-based broadcast data transmissions from the base stations 105 while the UE 115-*b* is in an idle state. Specifically, the UE 115-*b* may use a photo detector (e.g., an image sensor) to monitor for VLC-based broadcast transmissions, which may enable the UE 115-*b* to deactivate an RF receiver of the UE 115-*b* during idle mode operations. Deactivating the RF receiver may reduce idle mode power consumption at the UE 115-*b*. Thus, configuring the UE 115-*b* to receive VLC-based broadcast transmissions in an idle state may result in greater power savings at the UE 115-*b*. In addition, the base stations 105 may configure the UE 115-*b* with an extended DRX cycle based on a capability of the UE 115-*b* to receive broadcast VLC messages, which may further decrease power consumption at the UE 115-*b*.

Figure 4:
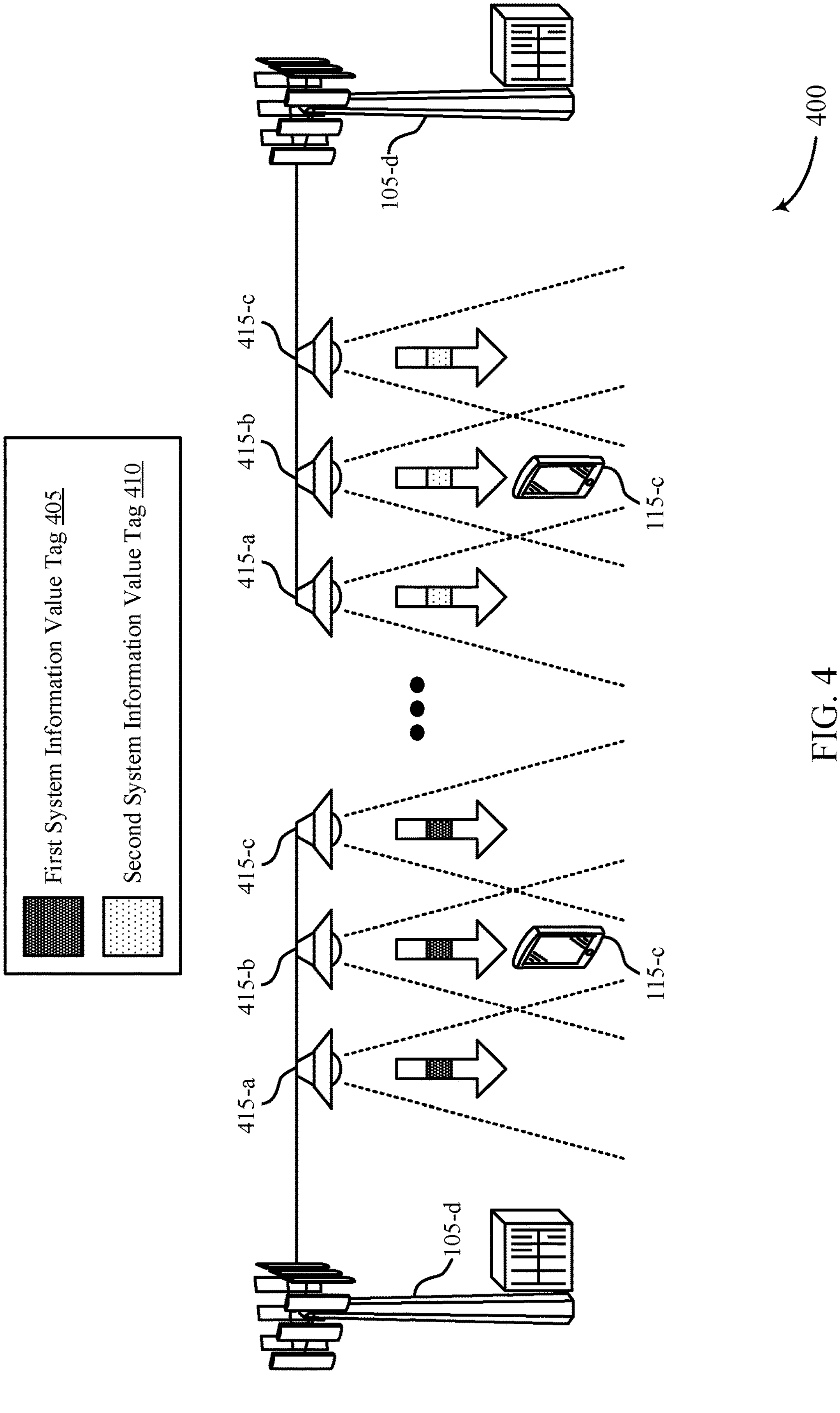

FIG. 4 illustrates an example of a wireless communications system 400 that supports techniques for VLC-assisted broadcast transmissions in accordance with aspects of the present disclosure. The wireless communications system 400 may implement or be implemented by aspects of the wireless communications system 100, the wireless communications system 200, or the wireless communications system 300. For example, the wireless communications system 400 may include a base station 105-*d* and a UE 115-*c*, which may be examples of corresponding devices described with reference to FIGS. 1 through 3. The wireless communications system 400 may also include LEDs 415, which may be examples of LEDs 215 or LEDs 315 described with reference to FIGS. 2 and 3. In the wireless communications system 400, the UE 115-*c* may identify a change in system information for the base station 105-*d* based on receiving a broadcast VLC message from the base station 105-*d*.

As described with reference to FIGS. 1 through 3, the base station 105-*d* may transmit VLC support information to the UE 115-*c* (e.g., via RF signaling, which may include system information or RRC signaling). The VLC support information may indicate whether the base station 105-*d* supports VLC-based broadcast transmissions. The VLC support information may also indicate an MCS for VLC, a monitoring period for VLC, or both. In some examples, the UE 115-*c* may transmit VLC capability information to the base station 105-*d* (e.g., via RF signaling) based on receiving the VLC support information from the base station 105-*d*. In other examples, the UE 115-*c* may receive the VLC support information based on transmitting the VLC capability information. The VLC capability information may indicate a capability of the UE 115-*c* to receive VLC-based broadcast transmissions. In some examples, the base station 105-*d* may configure the UE 115-*c* with a VLC-specific DRX cycle (e.g., an extended DRX cycle) based on receiving the VLC capability information from the UE 115-*c*.

If, for example, the UE 115-*c* determines that the base station 105-*d* supports VLC-based broadcast transmissions and the UE 115-*c* is capable of receiving such VLC-based broadcast transmissions, the UE 115-*c* may deactivate an RF receiver of the UE 115-*c* (e.g., the UE 115-*c* may enter an idle state). Accordingly, the UE 115-*c* may use a photo detector (e.g., an image sensor) of the UE 115-*c* to monitor for broadcast VLC messages from the base station 105-*d*. The base station 105-*d* may be connected (e.g., via a backhaul connection) to an LED 415-*a*, an LED 415-*b*, and an LED 415-*c*, which can be utilized to transmit VLC messages to the UE 115-*c*.

In the example of FIG. 4, the LEDs 415 can notify the UE 115-*c* of whether system information has changed for the base station 105-*d*. Specifically, the LEDs 415 may indicate system information message-specific value tags, which may convey a system information status of the base station 105-*d* to the UE 115-*c*. These system information value tags may be incremented each time there is a change in system information for the base station 105-*d*. As an example, the UE 115-*c* may acquire a first version of system information from the base station 105-*d* prior to entering an idle state. The first version of system information may be associated with a first system information value tag 405. The UE 115-*c* may store the first version of system information along with the first system information value tag 405 prior to deactivating an RF receiver of the UE 115-*c*.

While the RF receiver is deactivated, the UE 115-*c* may receive a VLC-based broadcast transmission from the base station 105-*d*. If, for example, the VLC-based broadcast transmission indicates a second system information value tag 410 that is different from the first system information value tag 405 (e.g., if the first system information value tag 405 does not match with the second system information value tag 410), the UE 115-*c* may determine that there has been a change in system information for the base station 105-*d*. Accordingly, the UE 115-*c* may reactivate the RF receiver to re-acquire system information from the base station 105-*d* (e.g., the serving cell for the UE 115-*c*). Alternatively, if the VLC-based broadcast transmission indicates the first system information value tag 405, the UE 115-*c* may determine that there has not been a change in system information for the base station 105-*d*. In such examples, the UE 115-*c* may maintain the RF receiver in an inactive state.

The wireless communications system 400 may support techniques for improved idle mode operations and reduced power consumption at the UE 115-*c*. For example, the described techniques may enable the UE 115-*c* to receive VLC-based broadcast data transmissions from the base station 105-*d* while the UE 115-*c* is in an idle state. Specifically, the UE 115-*c* may use a photo detector (e.g., an image sensor) to monitor for VLC-based broadcast transmissions, which may enable the UE 115-*c* to deactivate an RF receiver of the UE 115-*c* during idle mode operations. Deactivating the RF receiver may reduce idle mode power consumption at the UE 115-*c*. Thus, configuring the UE 115-*c* to receive VLC-based broadcast transmissions in an idle state may result in greater power savings at the UE 115-*c*. In addition, the base station 105-*d* may configure the UE 115-*c* with an extended DRX cycle based on a capability of the UE 115-*c* to receive broadcast VLC messages, which may further decrease power consumption at the UE 115-*c*.

Figure 5:
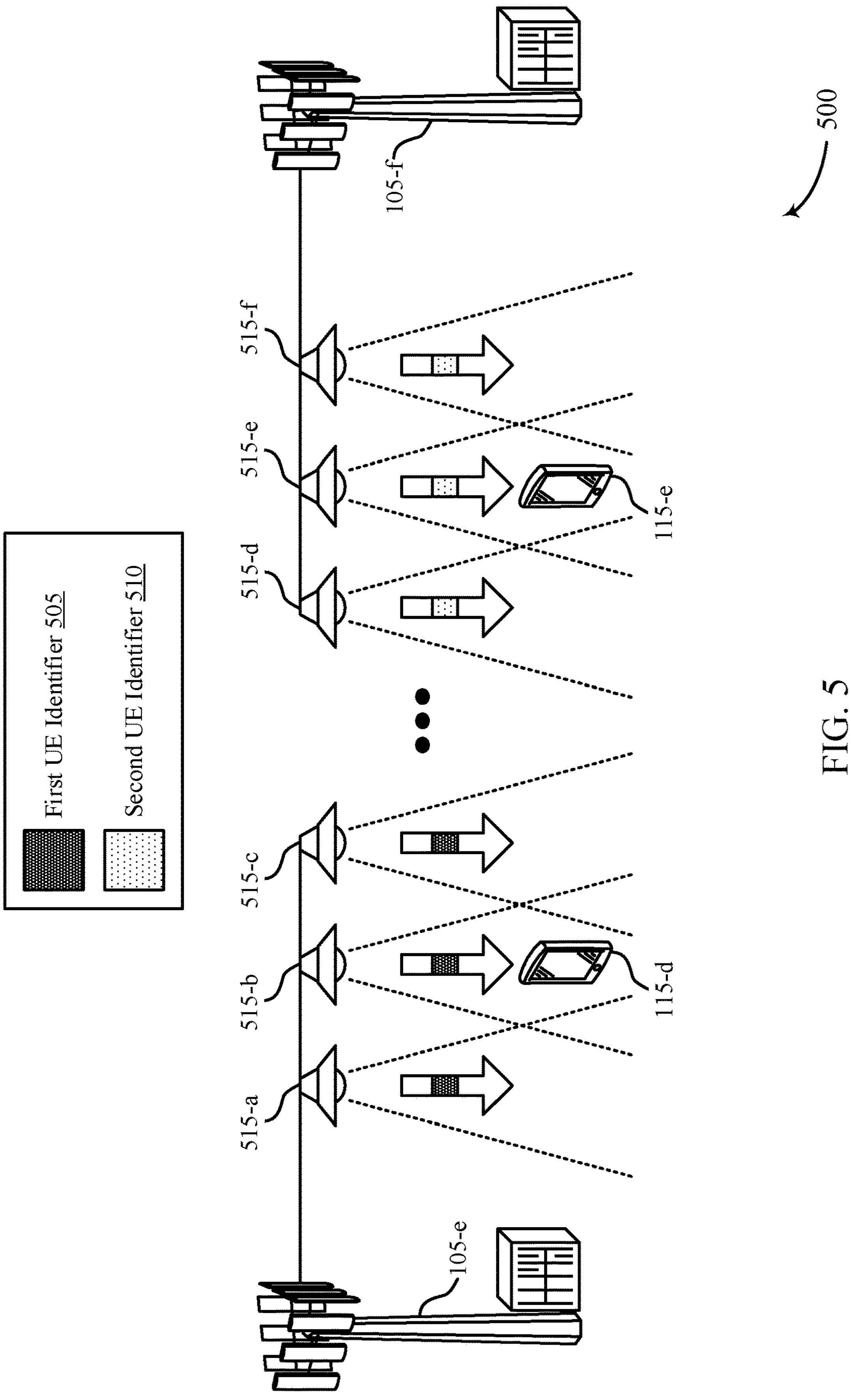

FIG. 5 illustrates an example of a wireless communications system 500 that supports techniques for VLC-assisted broadcast transmissions in accordance with aspects of the present disclosure. The wireless communications system 500 may implement or be implemented by aspects of the wireless communications system 100, the wireless communications system 200, the wireless communications system 300, or the wireless communications system 400. For example, the wireless communications system 500 may include a base station 105-*e*, a base station 105-*f*, a UE 115-*d*, and a UE 115-*e*, which may be examples of corresponding devices described with reference to FIGS. 1 through 4. The wireless communications system 500 may also include LEDs 515, which may be examples of LEDs 215, LEDs 315, or LEDs 415 described with reference to FIGS. 2 through 4. In the wireless communications system 500, the base stations 105 may transmit broadcast VLC messages that indicate specific UE identifiers.

As described with reference to FIGS. 1 through 4, the base stations 105 may transmit VLC support information to the UEs 115 via higher layer signaling such as system information or RRC signaling. The VLC support information may indicate whether the base stations 105 support VLC-based broadcast transmissions. The VLC support information may also indicate an MCS for VLC, a monitoring period for VLC, or both. In some examples, the UEs 115 may transmit VLC capability information to the base stations 105 (e.g., via RF signaling) based on receiving the VLC support information. In other examples, the base stations 105 may transmit the VLC support information based on receiving the VLC capability information from the UEs 115. The VLC capability information may indicate capabilities of the UEs 115 to receive VLC-based broadcast transmissions. In some examples, the base stations 105 may configure the UEs 115 with a VLC-specific DRX cycle (e.g., an extended DRX cycle) based on the VLC capability information. The base stations 105 may configure the UEs 115 with the VLC-specific DRX cycle via RF control signaling such as RRC signaling or DCI, among other examples.

If, for example, the UEs 115 determine that the base stations 105 support VLC-based broadcast transmissions and the UEs 115 are capable of receiving such VLC-based broadcast transmissions, the UEs 115 may deactivate respective RF receivers to conserve power. Accordingly, the UEs 115 may use photo detectors, such as image sensors (e.g., cameras), to monitor for broadcast VLC messages from the base stations 105. Each of the base stations 105 may be connected to LEDs 515, which can be used for transmission of VLC messages. For example, the base station 105-*e* may be connected to an LED 515-*a*, an LED 515-*b*, and an LED 515-*c*, and the base station 105-*f* may be connected to an LED 515-*d*, an LED 515-*e*, and an LED 515-*f*.

In the example of FIG. 5, each of the LEDs 515 may indicate a specific UE identifier. For example, the LEDs 515 that are connected to the base station 105-*e* may indicate a first UE identifier 505 corresponding to the UE 115-*d*, and the LEDs 515 that are connected to the base station 105-*f* may indicate a second UE identifier 510 corresponding to the UE 115-*e*. These UE identifiers may be used to inform the UEs 115 of incoming voice calls. As an example, if the UE 115-*d* receives a VLC-based broadcast transmission indicating the first UE identifier 505, the UE 115-*d* may determine there is an incoming voice call for the UE 115-*d* based on the first UE identifier 505. Accordingly, the UE 115-*d* may activate an RF receiver of the UE 115-*d* to receive the incoming voice call. In contrast, if the VLC-based broadcast transmission indicates the second UE identifier 510, the UE 115-*d* may maintain the RF receiver in an inactive state. That is, if an identifier of the UE 115-*d* (e.g., the first UE identifier 505) does not match with a UE identifier in a VLC-based broadcast transmission, the UE 115-*d* may maintain the RF receiver in an inactive state.

Additionally, or alternatively, the LEDs 515 may be used to transport paging indicators to the UEs 115 (e.g., when there are incoming calls for the UEs 115). In some examples, the UE identifiers indicated by the LEDs 515 may correspond to UE identifiers found in paging messages from the 5GC that uniquely identify the UEs 115 within a given tracking area. If, for example, the UE 115-*d* receives a broadcast VLC message from the base station 105-*e* (e.g., via the LEDs 515) indicating the first UE identifier 505 of the UE 115-*d* or a paging indicator that pertains to the UE 115-*d*, the UE 115-*d* may switch on (e.g., activate) an RF receiver and use the activated RF receiver to establish an RRC connection with the base station 105-*e*. Accordingly, the UE 115-*d* may perform RF-based communications with the base station 105-*e* based on establishing the RRC connection.

The wireless communications system 500 may support techniques for improved idle mode operations and reduced power consumption at the UEs 115. For example, the described techniques may enable the UEs 115 to receive VLC-based broadcast data transmissions from the base stations 105 while the UEs 115 are in an idle state. Specifically, the UEs 115 may use photo detectors (e.g., image sensors) to monitor for VLC-based broadcast transmissions, which may enable the UEs 115 to deactivate RF receivers during idle mode operations. Deactivating the RF receivers may reduce idle mode power consumption at the UEs 115. Thus, configuring the UEs 115 to receive VLC-based broadcast transmissions in an idle state may result in greater power savings at the UEs 115. In addition, the base stations 105 may configure the UEs 115 with an extended DRX cycle based on capabilities of the UEs 115 to receive broadcast VLC messages, which may further decrease power consumption at the UEs 115.

Figure 6:
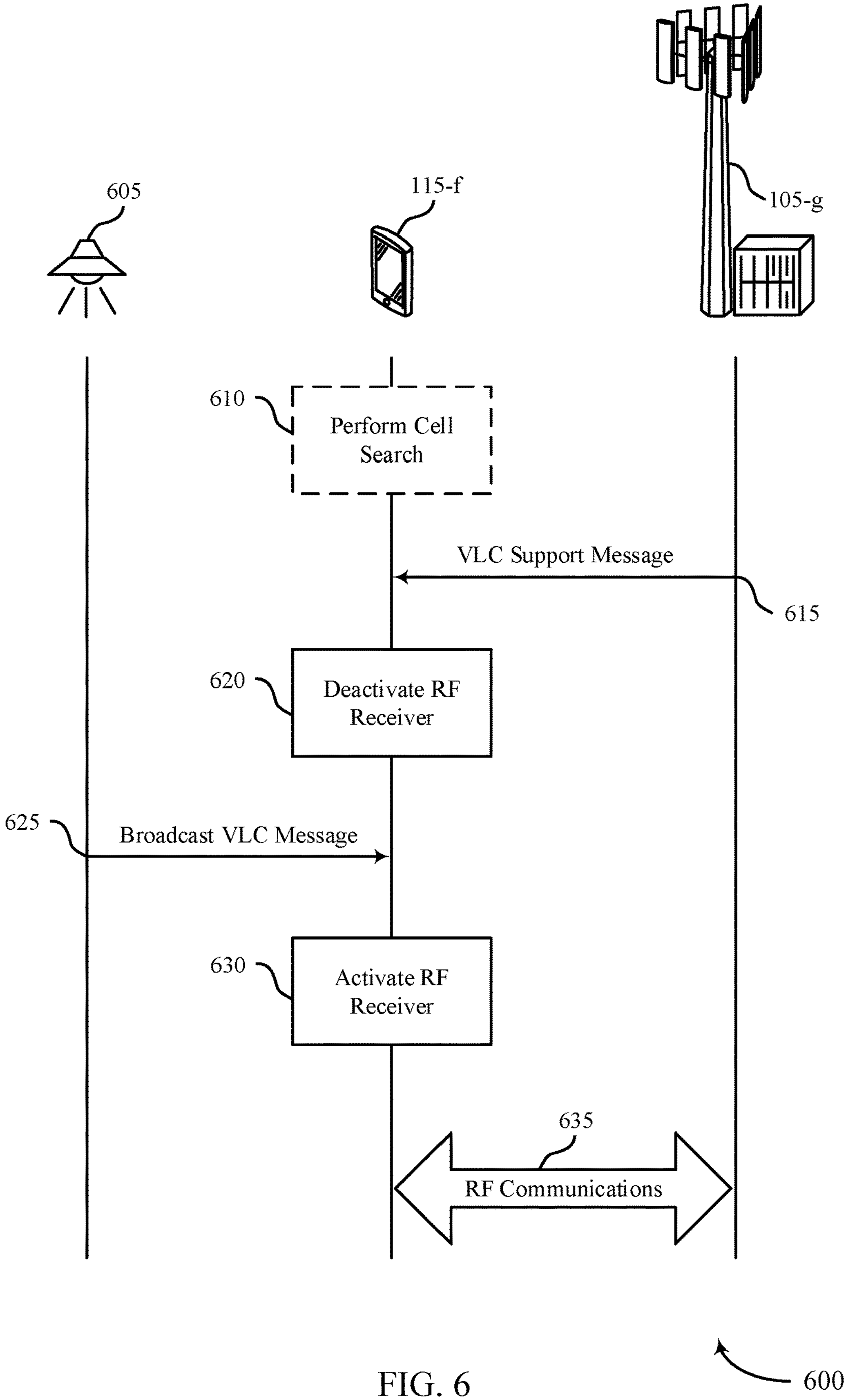
FIG. 6 illustrates an example of a process flow 600 that supports techniques for VLC-assisted broadcast transmissions in accordance with aspects of the present disclosure.

FIG. 6 illustrates an example of a process flow 600 that supports techniques for VLC-assisted broadcast transmissions in accordance with aspects of the present disclosure. The process flow 600 may implement or be implemented by aspects of the wireless communications system 100, the wireless communications system 200, the wireless communications system 300, the wireless communications system 400, or the wireless communications system 500. For example, the process flow 600 may include a base station 105-*g* and a UE 115-*f*, which may be examples of corresponding devices described with reference to FIGS. 1 through 5. The process flow 600 may also include an LED 605, which may be an example of LEDs 215, LEDs 315, LEDs 415, or LEDs 515 described with reference to FIGS. 2 through 5. In the following description of the process flow 600, operations between the UE 115-*f*, the base station 105-*g*, and the LED 605 may be performed in a different order or at a different time than as shown. Additionally, or alternatively, some operations may be omitted from the process flow 600, and other operations may be added to the process flow 600.

In some examples, the UE 115-*f* (e.g., an idle UE) may perform a cell search and measurement procedure at 610. As a result of the cell search and measurement procedure, the UE 115-*f* may camp on (e.g., monitor for communications from) the base station 105-*g*. At 615, the UE 115-*f* may receive an indication that the base station 105-*g* supports VLC (e.g., a VLC support message, VLC support information). The UE 115-*f* may receive the indication via RF signaling, which may include system information or RRC signaling, among other examples. In some examples, the UE 115-*f* may also receive an indication of an MCS for VLC, a monitoring period for VLC, or both. Additionally, or alternatively, the UE 115-*f* may transmit a VLC capability message to the base station 105-*g*. The UE 115-*f* may transmit the VLC capability message based on receiving the indication that the base station 105-*g* supports VLC. Alternatively, the UE 115-*f* may receive the indication that the base station 105-*g* supports VLC based on transmitting the VLC capability message to the base station 105-*g*. That is, the base station 105-*g* may transmit a VLC support indication to the UE 115-*f* based on receiving a VLC capability message from the UE 115-*f*. The VLC capability message may indicate a capability of the UE 115-*f* to receive VLC-based broadcast data transmissions. In some examples, the base station 105-*g* may configure the UE 115-*f* with an extended DRX cycle (e.g., a VLC-specific DRX cycle) based on the capability of the UE 115-*f* to receive VLC-based broadcast data transmissions.

At 620, the UE 115-*f* may deactivate an RF receiver of the UE 115-*f* based on receiving the indication that the base station 105-*g* supports VLC. In some examples, the UE 115-*f* may deactivate the RF receiver during one or more inactive durations of the extended DRX cycle, and may reactivate the RF receiver during one or more active durations of the extended DRX cycle. At 625, the UE 115-*f* may receive a VLC message (e.g., a broadcast VLC message, a VLC-based broadcast data transmission) from the LED 605 using a photo detector (e.g., an image sensor) of the UE 115-*f*. The UE 115-*f* may receive the VLC message while the RF receiver of the UE 115-*f* is in an inactive state (e.g., while the RF receiver is deactivated). In some examples, the UE 115-*f* may receive the VLC message during an inactive duration of the extended DRX cycle. Additionally, or alternatively, the UE 115-*f* may receive the VLC message based on at least one of deactivating the RF receiver or receiving the indication that the base station 105-*g* supports VLC. For example, deactivating the RF receiver, receiving the indication that the base station 105-*g* supports VLC, or a combination thereof may trigger the UE 115-*f* to monitor for a VLC message from the base station 105-*g*.

At 630, the UE 115-*f* may activate the RF receiver of the UE 115-*f* based on a content of the VLC message. The content of the VLC message may include a PCI of the base station 105-*g*, a system information value tag corresponding to the base station 105-*g*, or an identifier of the UE 115-*f*, among other examples. In some examples, the UE 115-*f* may perform a cell reselection procedure based on the content of the VLC message. For example, if the UE 115-*f* was previously connected to a different serving cell and the VLC message indicates a PCI of the base station 105-*g*, the UE 115-*f* may perform a cell reselection procedure to establish a connection with the base station 105-*g*. In other examples, the UE 115-*f* may identify a change in system information for the base station 105-*g* based on the content of the VLC message. Additionally, or alternatively, the UE 115-*f* may identify an incoming voice call for the UE 115-*f* or a paging indicator intended for the UE 115-*f* based on the content of the VLC message.

At 635, the UE 115-*f* may perform RF-based communications with the base station 105-*g* based on activating the RF receiver of the UE 115-*f*. For example, the UE 115-*f* may receive a downlink data transmission from the base station 105-*g* using the RF receiver. Additionally, or alternatively, the UE 115-*f* may use the RF receiver to receive an incoming voice call or to monitor for paging messages from the base station 105-*g*. In some examples (e.g., if the UE 115-*f* identifies a change in system information for the base station 105-*g* based on a system information value tag indicated by the VLC message), the UE 115-*f* may use the RF receiver to acquire updated system information from the base station 105-*g*.

The process flow 600 may support techniques for improved idle mode operations and reduced power consumption at the UE 115-*f*. For example, the described techniques may enable the UE 115-*f* to receive VLC-based broadcast data transmissions from the base station 105-*g* (e.g., via the LED 605) while the UE 115-*f* is in an idle state. Specifically, the UE 115-*f* may use a photo detector (e.g., an image sensor) to monitor for VLC-based broadcast transmissions from the base station 105-*g*, which may enable the UE 115-*f* to deactivate an RF receiver of the UE 115-*f* during idle mode operations. Deactivating the RF receiver may reduce idle mode power consumption at the UE 115-*f*. Thus, configuring the UE 115-*f* to receive VLC-based broadcast transmissions in an idle state may result in greater power savings at the UE 115-*f*. In addition, the base station 105-*g* may configure the UE 115-*f* with an extended DRX cycle based on a capability of the UE 115-*f* to receive broadcast VLC messages, which may further decrease power consumption at the UE 115-*f*.

Figure 7:
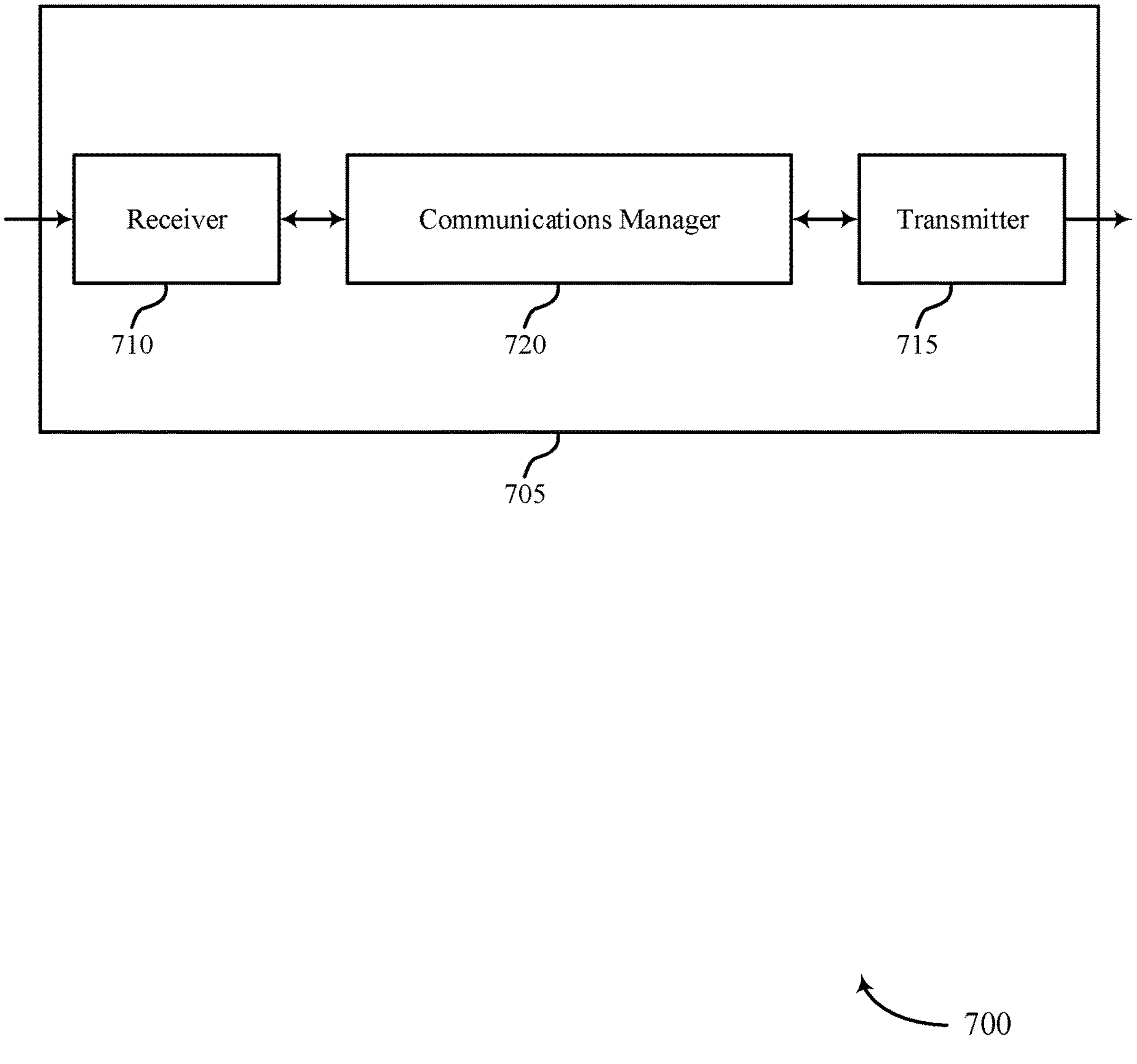
FIGS. 7 and 8 show block diagrams of devices that support techniques for VLC-assisted broadcast transmissions in accordance with aspects of the present disclosure.

FIG. 7 shows a block diagram 700 of a device 705 that supports techniques for VLC-assisted broadcast transmissions in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for VLC-assisted broadcast transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for VLC-assisted broadcast transmissions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for VLC-assisted broadcast transmissions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at the device 705 in accordance with examples as disclosed herein. For example, the communications manager 720 may be configured as or otherwise support a means for receiving, from a base station, an indication that the base station supports VLC. The communications manager 720 may be configured as or otherwise support a means for deactivating a RF receiver of the device 705 based on receiving the indication. The communications manager 720 may be configured as or otherwise support a means for receiving a VLC message at a photo detector of the device 705. The communications manager 720 may be configured as or otherwise support a means for activating the RF receiver of the device 705 based on a content of the VLC message. The communications manager 720 may be configured as or otherwise support a means for communicating with the base station using the RF receiver.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption based on reducing a time duration for which an RF receiver of the device 705 is activated. For example, the described techniques may enable the device 705 to receive VLC-based broadcast data transmissions from a base station while the device 705 is in an idle mode. Configuring the device 705 to receive VLC-based broadcast data transmissions may reduce a number of times that the device 705 uses the RF receiver (e.g., while the device 705 is in an idle mode), which may result in decreased power consumption at the device 705, among other benefits.

Figure 8:
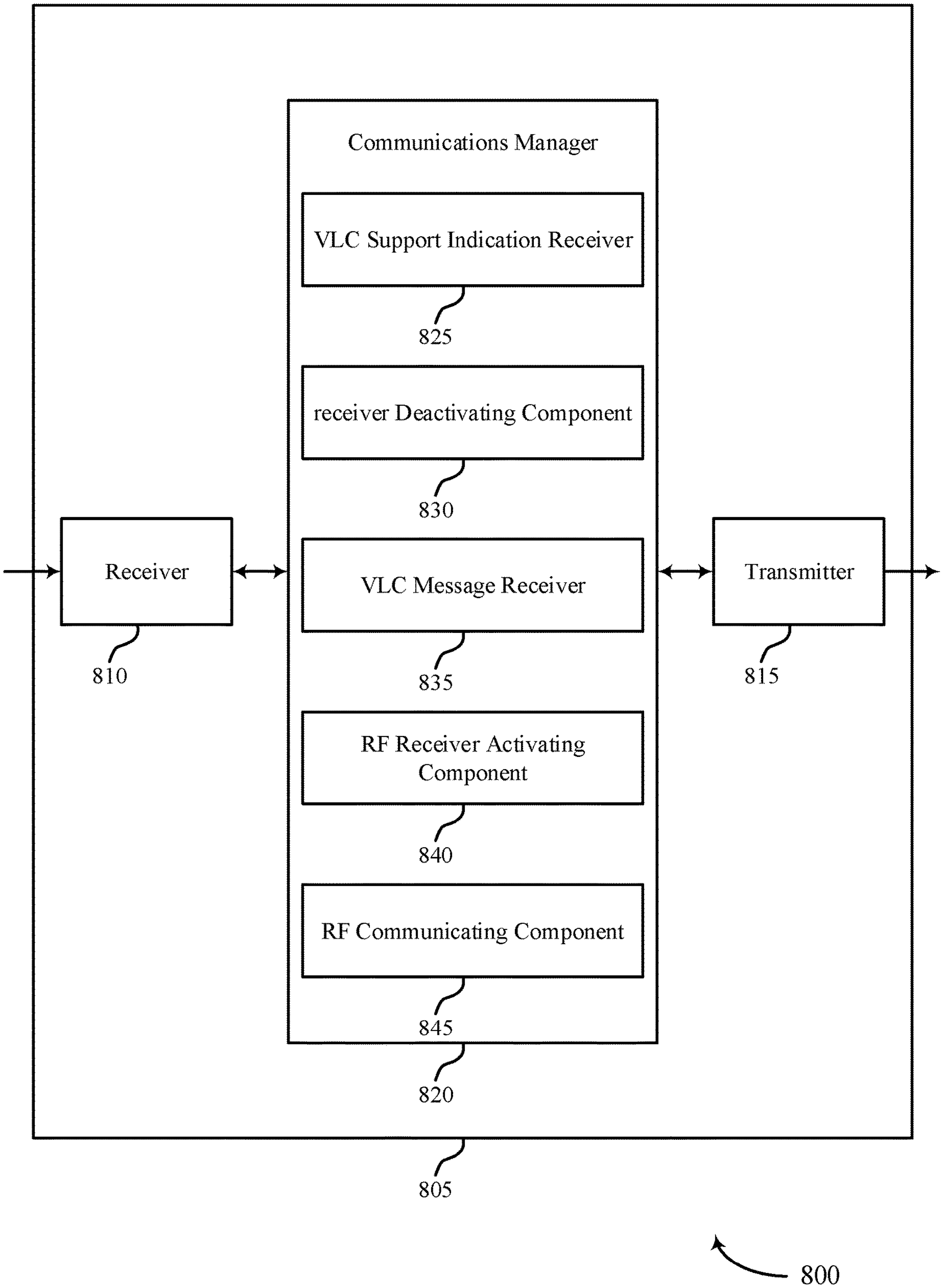

FIG. 8 shows a block diagram 800 of a device 805 that supports techniques for VLC-assisted broadcast transmissions in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for VLC-assisted broadcast transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for VLC-assisted broadcast transmissions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for VLC-assisted broadcast transmissions as described herein. For example, the communications manager 820 may include an VLC support indication receiver 825, an RF receiver deactivating component 830, an VLC message receiver 835, an RF receiver activating component 840, an RF communicating component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at the device 805 in accordance with examples as disclosed herein. The VLC support indication receiver 825 may be configured as or otherwise support a means for receiving, from a base station, an indication that the base station supports VLC. The RF receiver deactivating component 830 may be configured as or otherwise support a means for deactivating a RF receiver of the device 805 based on receiving the indication. The VLC message receiver 835 may be configured as or otherwise support a means for receiving a VLC message at a photo detector of the device 805. The RF receiver activating component 840 may be configured as or otherwise support a means for activating the RF receiver of the device 805 based on a content of the VLC message. The RF communicating component 845 may be configured as or otherwise support a means for communicating with the base station using the RF receiver.

Figure 9:
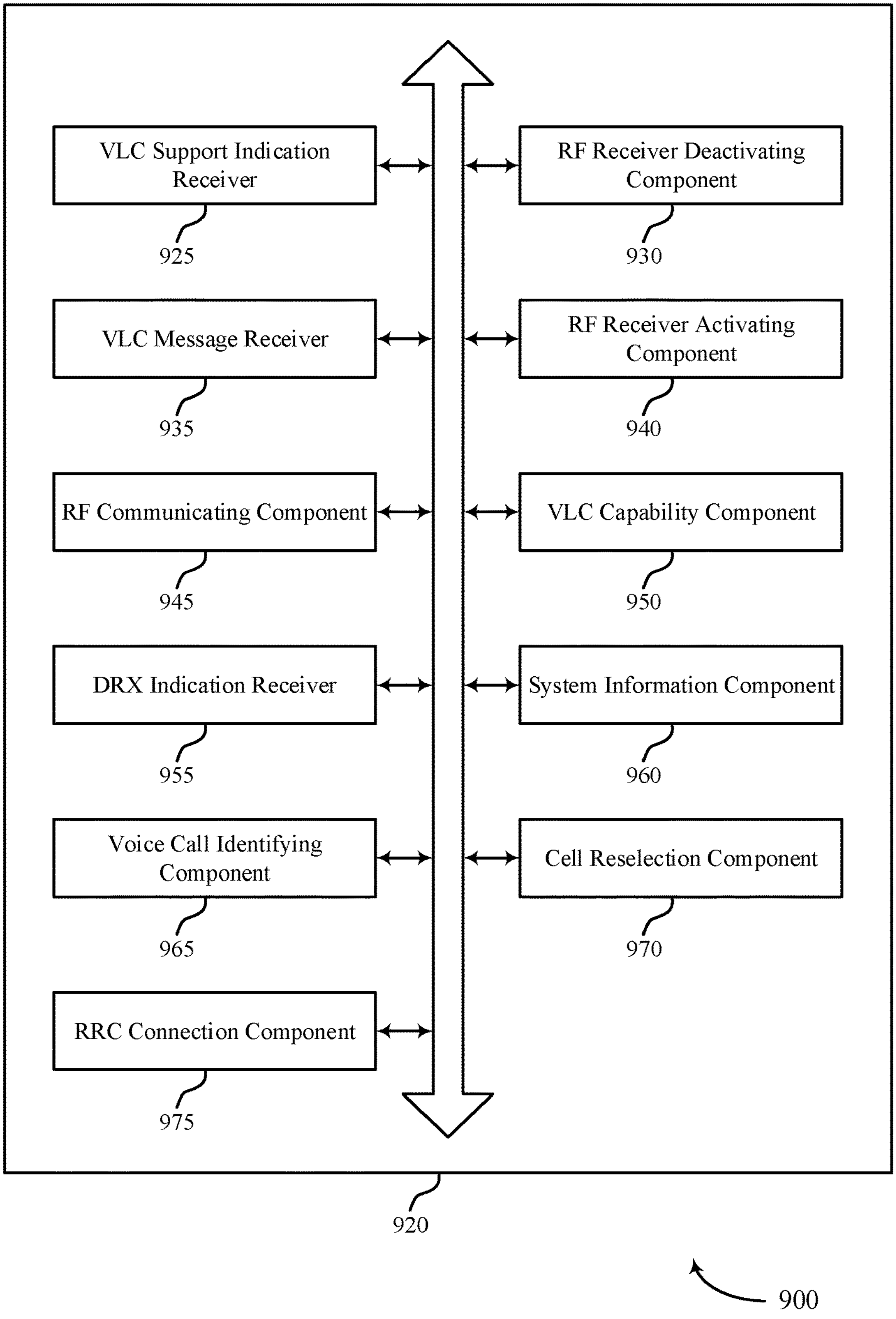
FIG. 9 shows a block diagram of a communications manager that supports techniques for VLC-assisted broadcast transmissions in accordance with aspects of the present disclosure.

FIG. 9 shows a block diagram 900 of a communications manager 920 that supports techniques for VLC-assisted broadcast transmissions in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for VLC-assisted broadcast transmissions as described herein. For example, the communications manager 920 may include an VLC support indication receiver 925, an RF receiver deactivating component 930, an VLC message receiver 935, an RF receiver activating component 940, an RF communicating component 945, an VLC capability component 950, a DRX indication receiver 955, a system information component 960, a voice call identifying component 965, a cell reselection component 970, an RRC connection component 975, or any combination thereof. Each of these components may communicate, directly or indirectly, with one another (e.g., via one or more buses).

The communications manager 920 may support wireless communications at the device 905 in accordance with examples as disclosed herein. The VLC support indication receiver 925 may be configured as or otherwise support a means for receiving, from a base station, an indication that the base station supports VLC. The RF receiver deactivating component 930 may be configured as or otherwise support a means for deactivating a RF receiver of the device 905 based on receiving the indication. The VLC message receiver 935 may be configured as or otherwise support a means for receiving a VLC message at a photo detector of the device 905. The RF receiver activating component 940 may be configured as or otherwise support a means for activating the RF receiver of the device 905 based on a content of the VLC message. The RF communicating component 945 may be configured as or otherwise support a means for communicating with the base station using the RF receiver.

In some examples, to support receiving the VLC message, the VLC message receiver 935 may be configured as or otherwise support a means for receiving a broadcast VLC message indicating a system information value tag, where activating the RF receiver of the device 905 is based on the system information value tag.

In some examples, the system information component 960 may be configured as or otherwise support a means for identifying a change in system information for the base station based on the system information value tag, where activating the RF receiver is based on identifying the change in system information.

In some examples, to support receiving the VLC message, the VLC message receiver 935 may be configured as or otherwise support a means for receiving the VLC message indicating an identifier of the UE, where activating the RF receiver is based on the VLC message indicating the identifier of the UE.

In some examples, the voice call identifying component 965 may be configured as or otherwise support a means for identifying an incoming voice call for the device 905 based on the VLC message indicating the identifier of the UE, where activating the RF receiver is based on identifying the incoming voice call.

In some examples, to support receiving the VLC message, the VLC message receiver 935 may be configured as or otherwise support a means for receiving a broadcast VLC message indicating a PCI of the second base station, where activating the RF receiver of the device 905 is based on the broadcast VLC message indicating the PCI of the second base station.

In some examples, the cell reselection component 970 may be configured as or otherwise support a means for performing a cell reselection procedure based on the broadcast VLC message indicating the PCI of the second base station. In some examples, the RRC connection component 975 may be configured as or otherwise support a means for establishing a RRC connection with the second base station based on performing the cell reselection procedure.

In some examples, to support receiving the indication that the base station supports VLC, the VLC support indication receiver 925 may be configured as or otherwise support a means for receiving, from the base station, system information or RRC signaling that indicates VLC assistance information for broadcast VLC messages.

In some examples, the VLC capability component 950 may be configured as or otherwise support a means for transmitting, to the base station, a capability message indicating a capability of the device 905 to receive broadcast VLC, where receiving the VLC message is based on transmitting the capability message.

In some examples, the DRX indication receiver 955 may be configured as or otherwise support a means for receiving, from the base station and based on a capability of the device 905 to receive broadcast VLC, an indication of an extended DRX cycle for the UE.

In some examples, to support receiving the VLC message, the VLC message receiver 935 may be configured as or otherwise support a means for receiving a broadcast VLC message during an inactive duration of the extended DRX cycle, where activating the RF receiver of the device 905 is based on receiving the broadcast VLC message during the inactive duration of the extended DRX cycle.

In some examples, to support communicating with the base station, the RF communicating component 945 may be configured as or otherwise support a means for receiving a downlink data message from the base station using the RF receiver.

In some examples, to support receiving the VLC message, the VLC message receiver 935 may be configured as or otherwise support a means for receiving the VLC message while the device 905 is in an idle state.

Figure 10:
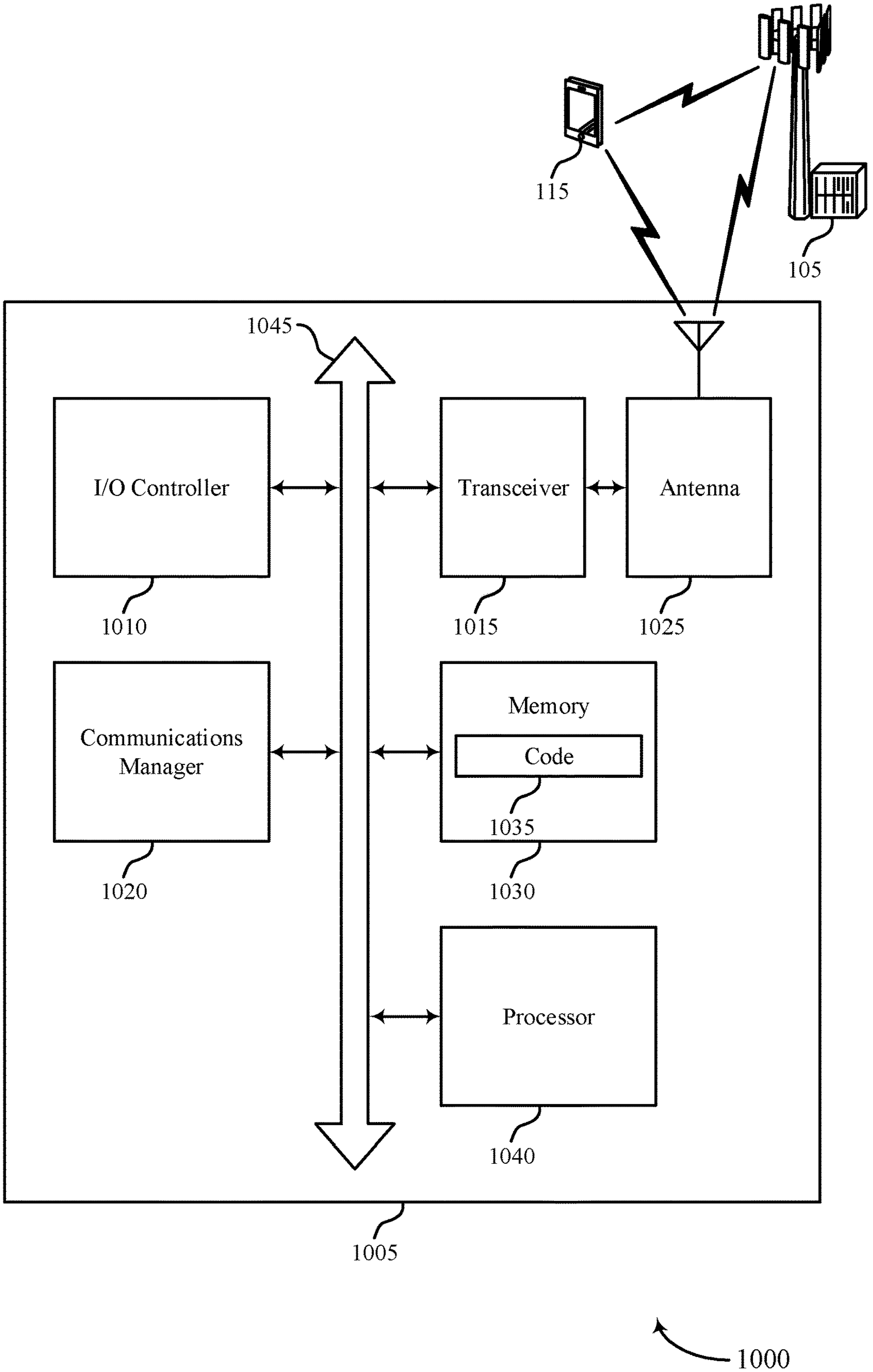
FIG. 10 shows a diagram of a system including a device that supports techniques for VLC-assisted broadcast transmissions in accordance with aspects of the present disclosure.

FIG. 10 shows a diagram of a system 1000 including a device 1005 that supports techniques for VLC-assisted broadcast transmissions in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for VLC-assisted broadcast transmissions). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at the device 1005 in accordance with examples as disclosed herein. For example, the communications manager 1020 may be configured as or otherwise support a means for receiving, from a base station, an indication that the base station supports VLC. The communications manager 1020 may be configured as or otherwise support a means for deactivating a RF receiver of the device 1005 based on receiving the indication. The communications manager 1020 may be configured as or otherwise support a means for receiving a VLC message at a photo detector of the device 1005. The communications manager 1020 may be configured as or otherwise support a means for activating the RF receiver of the device 1005 based on a content of the VLC message. The communications manager 1020 may be configured as or otherwise support a means for communicating with the base station using the RF receiver.

By including or configuring the communications manager 1020 in accordance with examples as described herein, the device 1005 may support techniques for improved idle mode operations at the device 1005 based on using a photo detector to monitor for broadcast VLC messages. Specifically, the device 1005 may be configured to monitor for broadcast VLC messages while the device 1005 is in an idle state, which may enable the device 1005 to receive broadcast notifications even when an RF receiver of the device 1005 is deactivated.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for VLC-assisted broadcast transmissions as described herein, or the processor 1040 and the memory 1030 may be otherwise configured to perform or support such operations.

Figure 11:
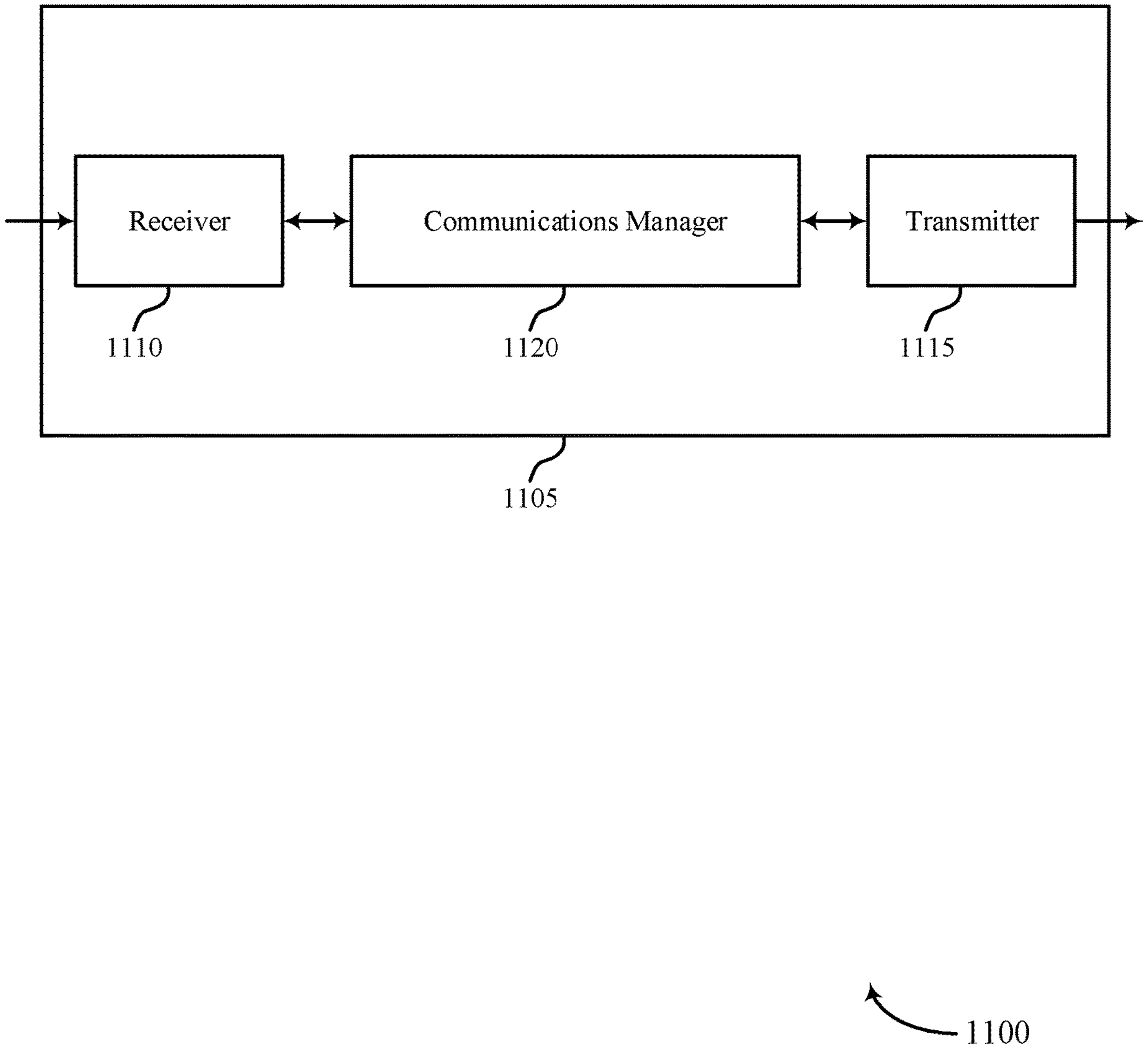
FIGS. 11 and 12 show block diagrams of devices that support techniques for VLC-assisted broadcast transmissions in accordance with aspects of the present disclosure.

FIG. 11 shows a block diagram 1100 of a device 1105 that supports techniques for VLC-assisted broadcast transmissions in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for VLC-assisted broadcast transmissions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for VLC-assisted broadcast transmissions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for VLC-assisted broadcast transmissions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at the device 1105 in accordance with examples as disclosed herein. For example, the communications manager 1120 may be configured as or otherwise support a means for transmitting, to a UE, an indication that the device 1105 supports VLC. The communications manager 1120 may be configured as or otherwise support a means for transmitting, in accordance with the indication and via one or more LEDs, a VLC message including a content that triggers activation of a RF receiver at the UE. The communications manager 1120 may be configured as or otherwise support a means for communicating via RF communications with the UE based on transmitting the VLC message.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption based on reducing a number of RF-based broadcast messages transmitted by the device 1105. For example, the described techniques may enable the device 1105 to transmit VLC-based broadcast data messages via one or more LEDs, which may be more power efficient than transmitting RF-based broadcast data messages via an RF transmit chain of the device 1105.

Figure 12:
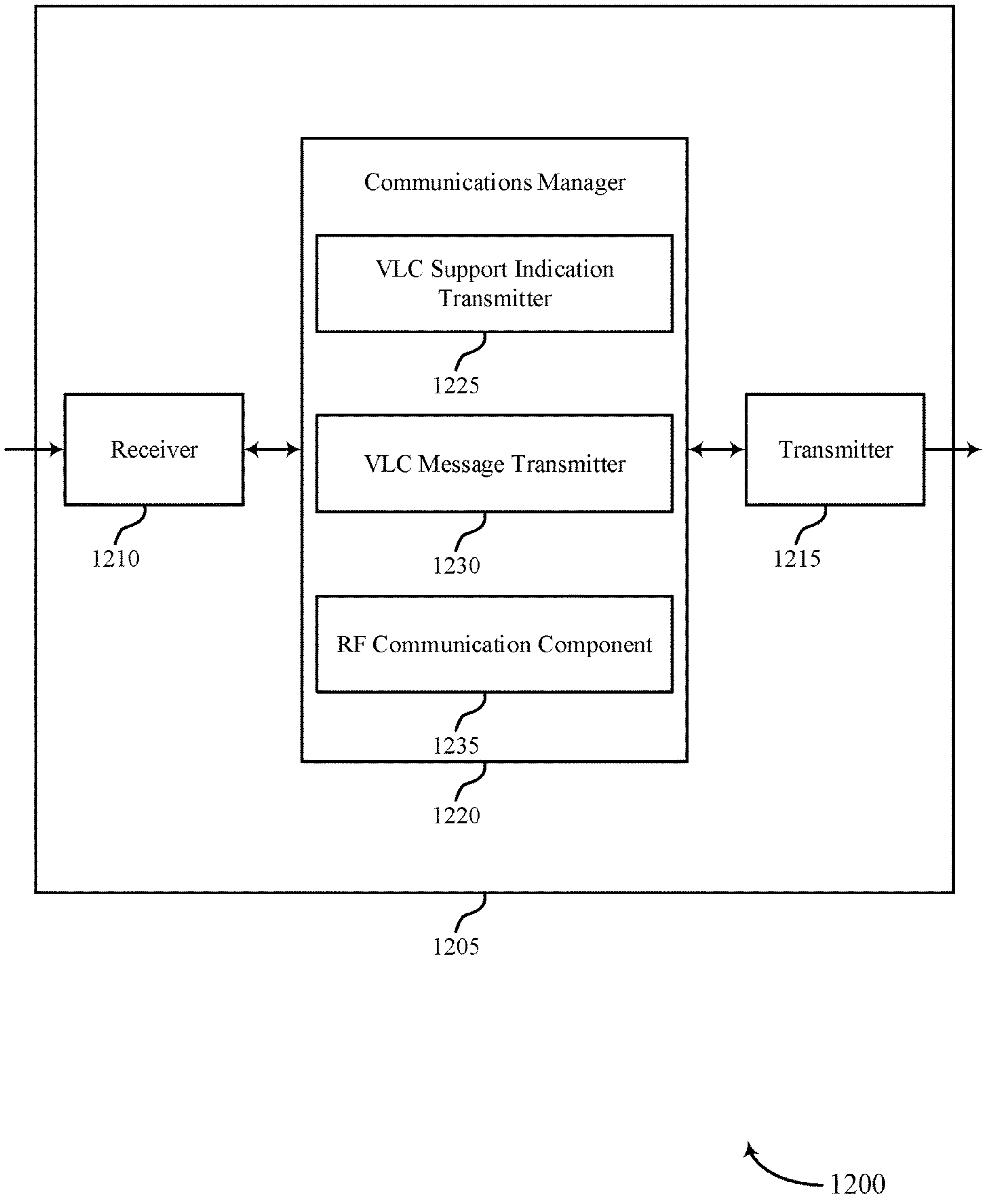

FIG. 12 shows a block diagram 1200 of a device 1205 that supports techniques for VLC-assisted broadcast transmissions in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for VLC-assisted broadcast transmissions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for VLC-assisted broadcast transmissions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for VLC-assisted broadcast transmissions as described herein. For example, the communications manager 1220 may include an VLC support indication transmitter 1225, an VLC message transmitter 1230, an RF communication component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at the device 1205 in accordance with examples as disclosed herein. The VLC support indication transmitter 1225 may be configured as or otherwise support a means for transmitting, to a UE, an indication that the device 1205 supports VLC. The VLC message transmitter 1230 may be configured as or otherwise support a means for transmitting, in accordance with the indication and via one or more LEDs, a VLC message including a content that triggers activation of a RF receiver at the UE. The RF communication component 1235 may be configured as or otherwise support a means for communicating via RF communications with the UE based on transmitting the VLC message.

Figure 13:
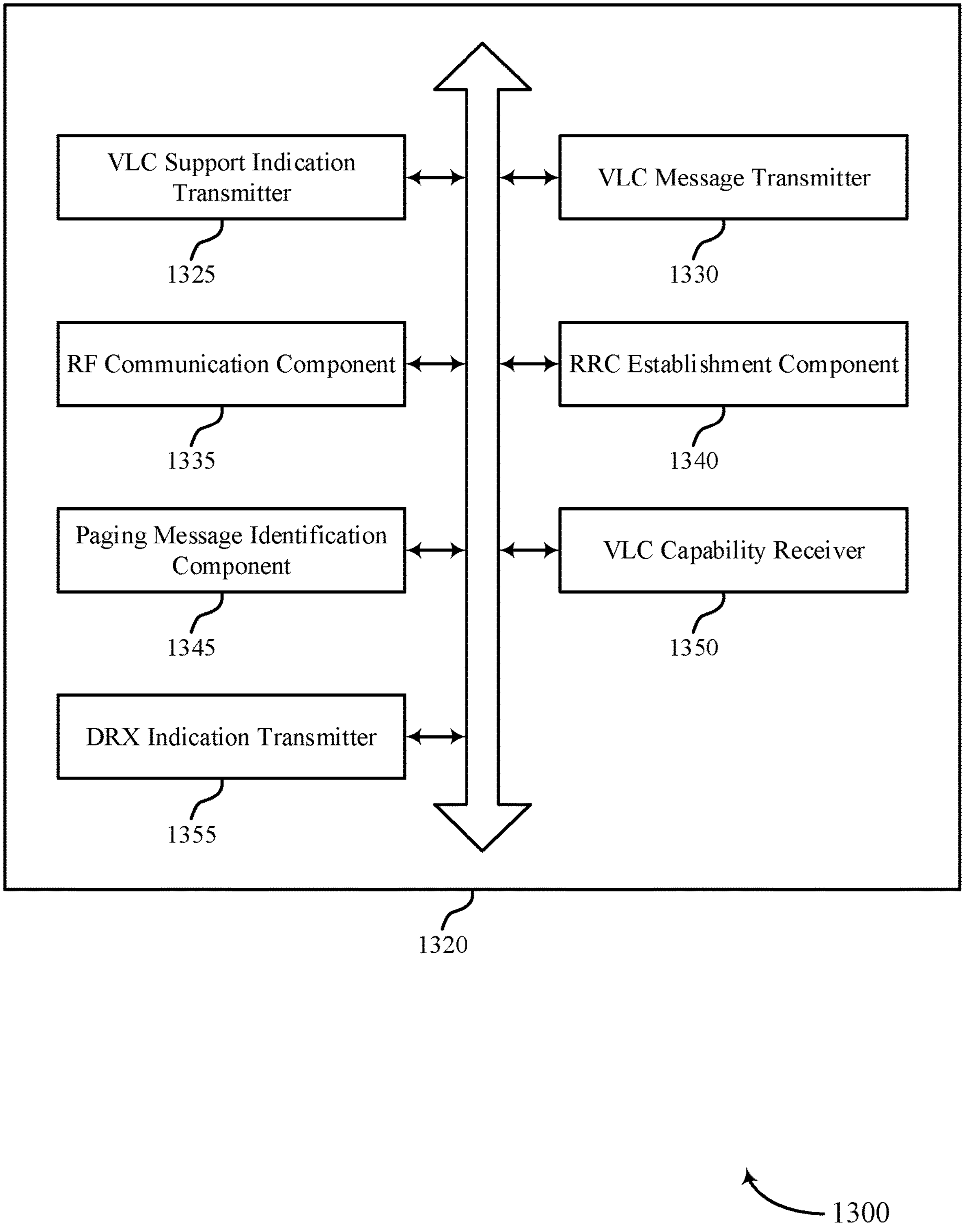
FIG. 13 shows a block diagram of a communications manager that supports techniques for VLC-assisted broadcast transmissions in accordance with aspects of the present disclosure.

FIG. 13 shows a block diagram 1300 of a communications manager 1320 that supports techniques for VLC-assisted broadcast transmissions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for VLC-assisted broadcast transmissions as described herein. For example, the communications manager 1320 may include an VLC support indication transmitter 1325, an VLC message transmitter 1330, an RF communication component 1335, an RRC establishment component 1340, a paging message identification component 1345, an VLC capability receiver 1350, a DRX indication transmitter 1355, or any combination thereof. Each of these components may communicate, directly or indirectly, with one another (e.g., via one or more buses).

The communications manager 1320 may support wireless communications at the device 1305 in accordance with examples as disclosed herein. The VLC support indication transmitter 1325 may be configured as or otherwise support a means for transmitting, to a UE, an indication that the device 1305 supports VLC. The VLC message transmitter 1330 may be configured as or otherwise support a means for transmitting, in accordance with the indication and via one or more LEDs, a VLC message including a content that triggers activation of a RF receiver at the UE. The RF communication component 1335 may be configured as or otherwise support a means for communicating via RF communications with the UE based on transmitting the VLC message.

In some examples, to support transmitting the VLC message, the VLC message transmitter 1330 may be configured as or otherwise support a means for transmitting, via the one or more LEDs, a broadcast VLC message indicating a PCI of the device 1305, where communicating via RF communications with the UE is based on the broadcast VLC message indicating the PCI of the device 1305.

In some examples, the RRC establishment component 1340 may be configured as or otherwise support a means for establishing a RRC connection with the UE based on the content of the VLC message, where communicating via RF communications with the UE is based on establishing the RRC connection with the UE.

In some examples, to support transmitting the VLC message, the VLC message transmitter 1330 may be configured as or otherwise support a means for transmitting, via the one or more LEDs, a broadcast VLC message indicating a system information value tag, where the system information value tag triggers activation of the RF receiver at the UE.

In some examples, to support transmitting the VLC message, the VLC message transmitter 1330 may be configured as or otherwise support a means for transmitting, via the one or more LEDs, the VLC message indicating an identifier of the UE, where the identifier of the UE triggers activation of the RF receiver at the UE.

In some examples, the paging message identification component 1345 may be configured as or otherwise support a means for identifying a paging message for the UE, where transmitting the VLC message is based on identifying the paging message.

In some examples, to support transmitting the indication that the device 1305 supports VLC, the VLC support indication transmitter 1325 may be configured as or otherwise support a means for transmitting, to the UE, system information or RRC signaling that indicates VLC assistance information for broadcast VLC messages.

In some examples, the VLC capability receiver 1350 may be configured as or otherwise support a means for receiving, from the UE, a capability message indicating a capability of the UE to receive broadcast VLC, where transmitting the VLC message to the UE is based on receiving the capability message from the UE.

In some examples, the DRX indication transmitter 1355 may be configured as or otherwise support a means for transmitting, to the UE and based on a capability of the UE to receive broadcast VLC, an indication of an extended DRX cycle for the UE.

In some examples, to support transmitting the VLC message, the VLC message transmitter 1330 may be configured as or otherwise support a means for transmitting, to the UE and via the one or more LEDs, the VLC message during an inactive duration of the extended DRX cycle.

In some examples, to support communicating via RF communications with the UE, the RF communication component 1335 may be configured as or otherwise support a means for transmitting a downlink data message to the UE based on transmitting the VLC message.

Figure 14:
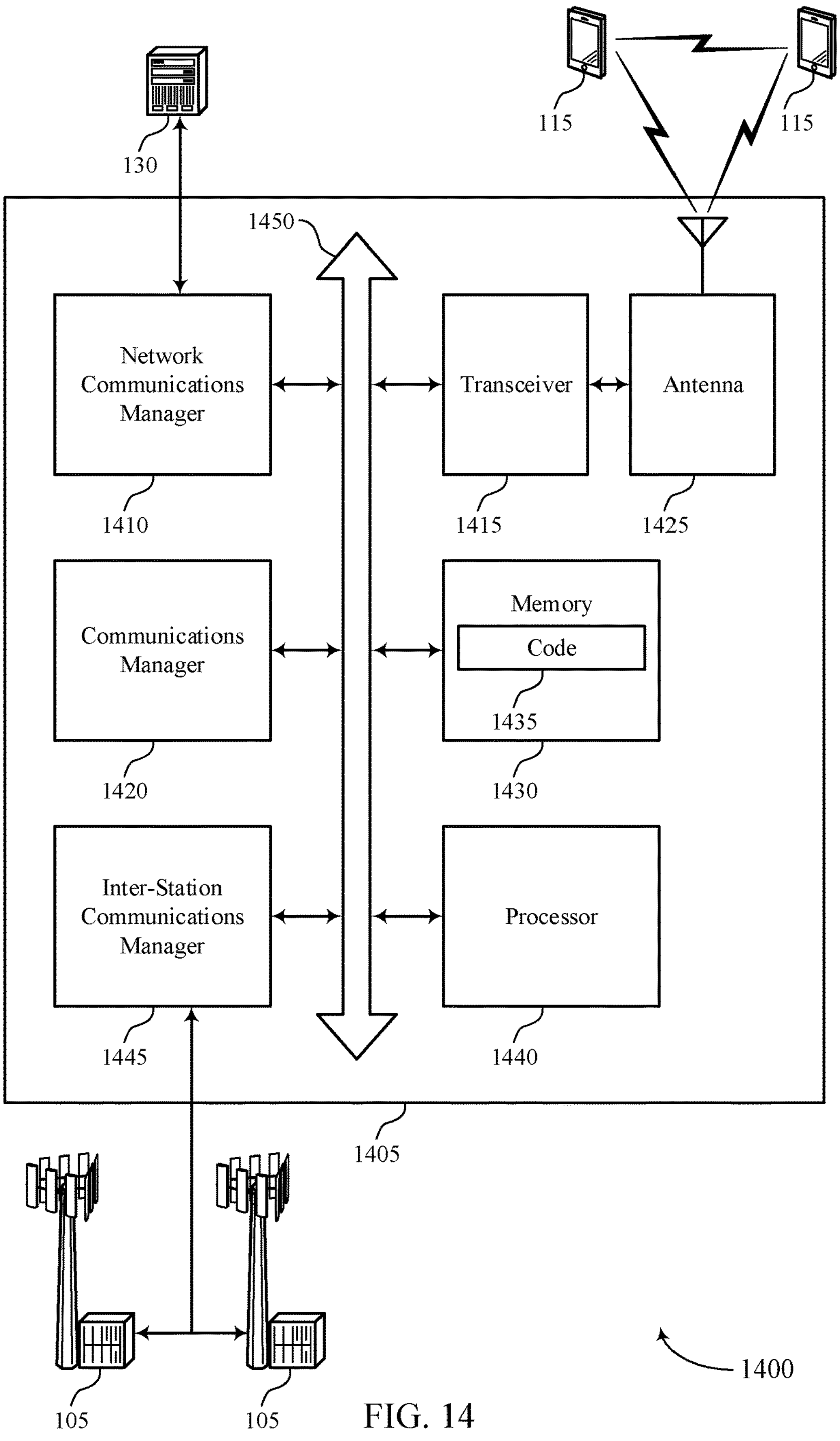
FIG. 14 shows a diagram of a system including a device that supports techniques for VLC-assisted broadcast transmissions in accordance with aspects of the present disclosure.

FIG. 14 shows a diagram of a system 1400 including a device 1405 that supports techniques for VLC-assisted broadcast transmissions in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for VLC-assisted broadcast transmissions). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at the device 1405 in accordance with examples as disclosed herein. For example, the communications manager 1420 may be configured as or otherwise support a means for transmitting, to a UE, an indication that the device 1405 supports VLC. The communications manager 1420 may be configured as or otherwise support a means for transmitting, in accordance with the indication and via one or more LEDs, a VLC message including a content that triggers activation of a RF receiver at the UE. The communications manager 1420 may be configured as or otherwise support a means for communicating via RF communications with the UE based on transmitting the VLC message.

By including or configuring the communications manager 1420 in accordance with examples as described herein, the device 1405 may support techniques for improved communication reliability at the device 1405. For example, the described techniques may enable the device 1405 to transmit VLC-based broadcast messages via one or more LEDs. These VLC-based broadcast messages may be received by a UE 115 in an idle state, even if an RF receiver of the UE 115 is deactivated. As such, the described techniques may improve the reliability of communications between the device 1405 and UEs 115 in an idle state.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for VLC-assisted broadcast transmissions as described herein, or the processor 1440 and the memory 1430 may be otherwise configured to perform or support such operations.

Figure 15:
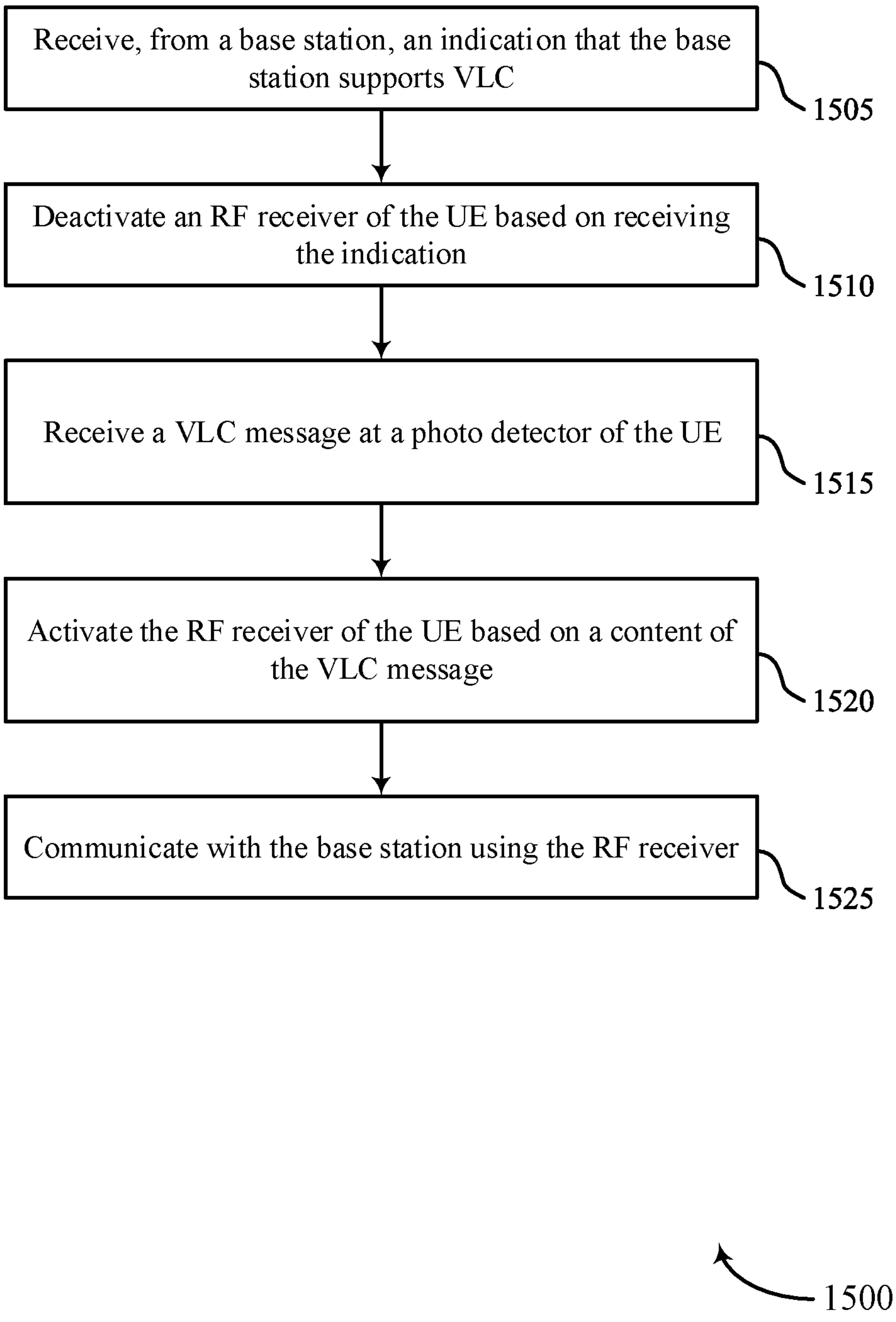
FIGS. 15 through 18 show flowcharts illustrating methods that support techniques for VLC-assisted broadcast transmissions in accordance with aspects of the present disclosure.

FIG. 15 shows a flowchart illustrating a method 1500 that supports techniques for VLC-assisted broadcast transmissions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, an indication that the base station supports VLC. The operations of 1505 may be performed in accordance with examples as disclosed herein. In some examples, aspects of the operations of 1505 may be performed by an VLC support indication receiver 925 as described with reference to FIG. 9.

At 1510, the method may include deactivating a RF receiver of the UE based on receiving the indication. The operations of 1510 may be performed in accordance with examples as disclosed herein. In some examples, aspects of the operations of 1510 may be performed by an RF receiver deactivating component 930 as described with reference to FIG. 9.

At 1515, the method may include receiving a VLC message at a photo detector of the UE. The operations of 1515 may be performed in accordance with examples as disclosed herein. In some examples, aspects of the operations of 1515 may be performed by an VLC message receiver 935 as described with reference to FIG. 9.

At 1520, the method may include activating the RF receiver of the UE based on a content of the VLC message. The operations of 1520 may be performed in accordance with examples as disclosed herein. In some examples, aspects of the operations of 1520 may be performed by an RF receiver activating component 940 as described with reference to FIG. 9.

At 1525, the method may include communicating with the base station using the RF receiver. The operations of 1525 may be performed in accordance with examples as disclosed herein. In some examples, aspects of the operations of 1525 may be performed by an RF communicating component 945 as described with reference to FIG. 9.

Figure 16:
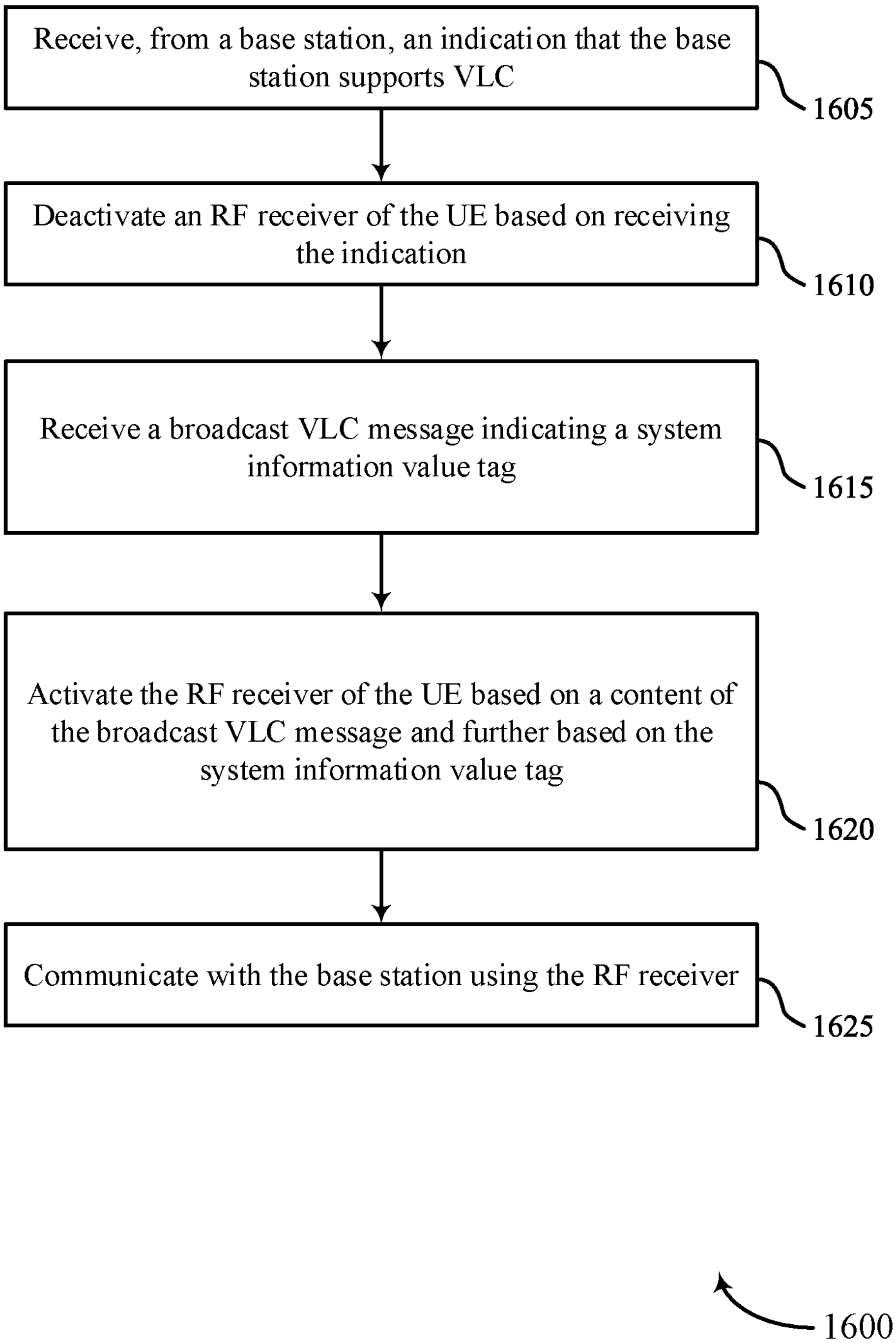

FIG. 16 shows a flowchart illustrating a method 1600 that supports techniques for VLC-assisted broadcast transmissions in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, an indication that the base station supports VLC. The operations of 1605 may be performed in accordance with examples as disclosed herein. In some examples, aspects of the operations of 1605 may be performed by an VLC support indication receiver 925 as described with reference to FIG. 9.

At 1610, the method may include deactivating a RF receiver of the UE based on receiving the indication. The operations of 1610 may be performed in accordance with examples as disclosed herein. In some examples, aspects of the operations of 1610 may be performed by an RF receiver deactivating component 930 as described with reference to FIG. 9.

At 1615, the method may include receiving a broadcast VLC message indicating a system information value tag. The operations of 1615 may be performed in accordance with examples as disclosed herein. In some examples, aspects of the operations of 1615 may be performed by an VLC message receiver 935 as described with reference to FIG. 9.

At 1620, the method may include activating the RF receiver of the UE based on a content of the VLC message and further based on the system information value tag. The operations of 1620 may be performed in accordance with examples as disclosed herein. In some examples, aspects of the operations of 1620 may be performed by an RF receiver activating component 940 as described with reference to FIG. 9.

At 1625, the method may include communicating with the base station using the RF receiver. The operations of 1625 may be performed in accordance with examples as disclosed herein. In some examples, aspects of the operations of 1625 may be performed by an RF communicating component 945 as described with reference to FIG. 9.

Figure 17:
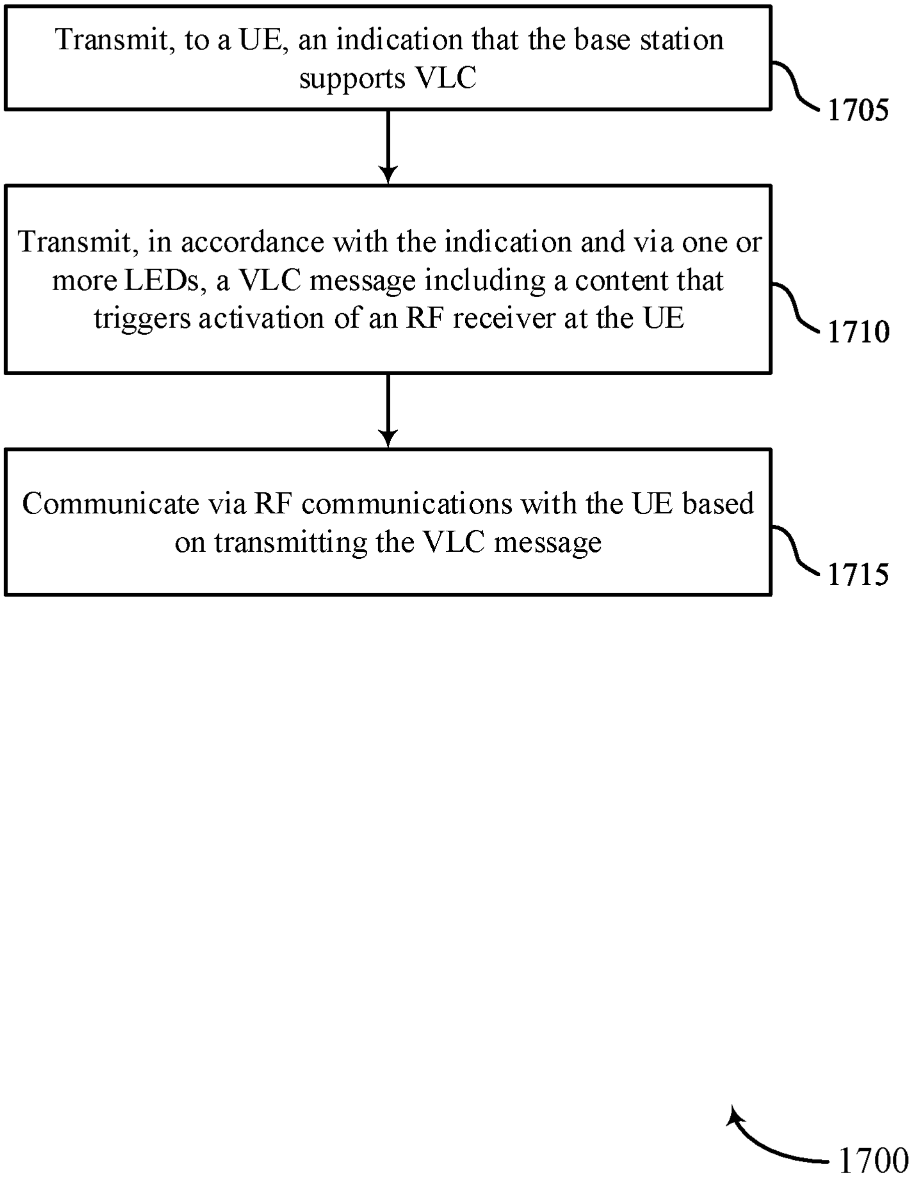

FIG. 17 shows a flowchart illustrating a method 1700 that supports techniques for VLC-assisted broadcast transmissions in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, an indication that the base station supports VLC. The operations of 1705 may be performed in accordance with examples as disclosed herein. In some examples, aspects of the operations of 1705 may be performed by an VLC support indication transmitter 1325 as described with reference to FIG. 13.

At 1710, the method may include transmitting, in accordance with the indication and via one or more LEDs, a VLC message including a content that triggers activation of a RF receiver at the UE. The operations of 1710 may be performed in accordance with examples as disclosed herein. In some examples, aspects of the operations of 1710 may be performed by an VLC message transmitter 1330 as described with reference to FIG. 13.

At 1715, the method may include communicating via RF communications with the UE based on transmitting the VLC message. The operations of 1715 may be performed in accordance with examples as disclosed herein. In some examples, aspects of the operations of 1715 may be performed by an RF communication component 1335 as described with reference to FIG. 13.

Figure 18:
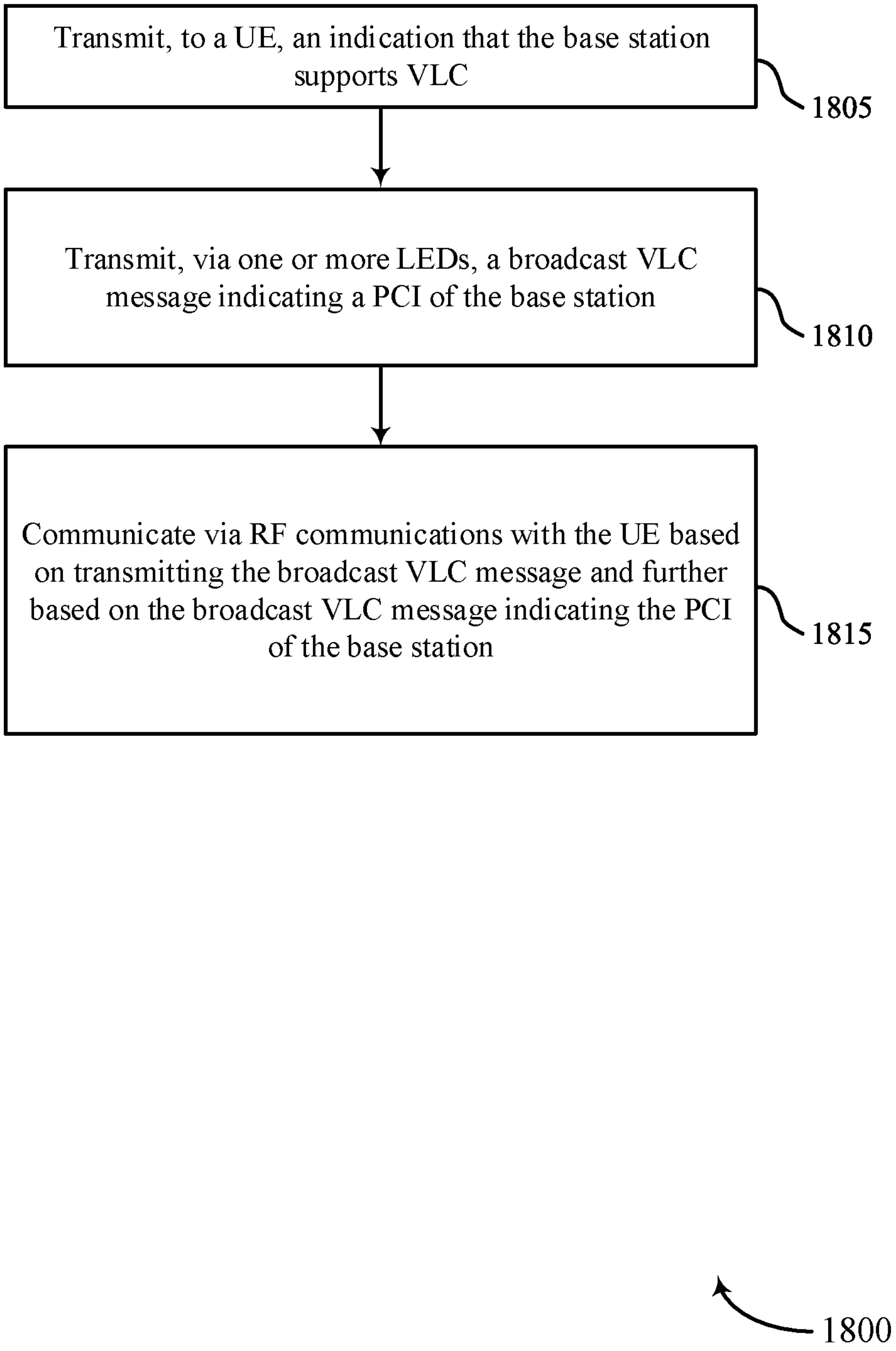

FIG. 18 shows a flowchart illustrating a method 1800 that supports techniques for VLC-assisted broadcast transmissions in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally, or alternatively, the base station may perform aspects of the described functions using special-purpose hardware.

At 1805, the method may include transmitting, to a UE, an indication that the base station supports VLC. The operations of 1805 may be performed in accordance with examples as disclosed herein. In some examples, aspects of the operations of 1805 may be performed by an VLC support indication transmitter 1325 as described with reference to FIG. 13.

At 1810, the method may include transmitting, via the one or more LEDs, a broadcast VLC message indicating a PCI of the base station. The operations of 1810 may be performed in accordance with examples as disclosed herein. In some examples, aspects of the operations of 1810 may be performed by an VLC message transmitter 1330 as described with reference to FIG. 13.

At 1815, the method may include communicating via RF communications with the UE based on transmitting the VLC message and further based on the broadcast VLC message indicating the PCI of the base station. The operations of 1815 may be performed in accordance with examples as disclosed herein. In some examples, aspects of the operations of 1815 may be performed by an RF communication component 1335 as described with reference to FIG. 13.

The following provides an overview of aspects of the present disclosure:

Aspect 1: A method for wireless communications at a UE, comprising: receiving, from a base station, an indication that the base station supports visible light communications; deactivating a radio frequency receiver of the UE based at least in part on receiving the indication; receiving a visible light communication message at a photo detector of the UE; activating the radio frequency receiver of the UE based at least in part on a content of the visible light communication message; and communicating with the base station using the radio frequency receiver.

Aspect 2: The method of aspect 1, wherein receiving the visible light communication message comprises: receiving a broadcast visible light communication message indicating a system information value tag, wherein activating the radio frequency receiver of the UE is based at least in part on the system information value tag.

Aspect 3: The method of aspect 2, further comprising: identifying a change in system information for the base station based at least in part on the system information value tag, wherein activating the radio frequency receiver is based at least in part on identifying the change in system information.

Aspect 4: The method of any of aspects 1 through 3, wherein receiving the visible light communication message comprises: receiving the visible light communication message indicating an identifier of the UE, wherein activating the radio frequency receiver is based at least in part on the visible light communication message indicating the identifier of the UE.

Aspect 5: The method of aspect 4, further comprising: identifying an incoming voice call for the UE based at least in part on the visible light communication message indicating the identifier of the UE, wherein activating the radio frequency receiver is based at least in part on identifying the incoming voice call.

Aspect 6: The method of any of aspects 1 through 5, wherein receiving the visible light communication message comprises: receiving, from a second base station, a broadcast visible light communication message indicating a physical cell identifier of the second base station, wherein activating the radio frequency receiver of the UE is based at least in part on the broadcast visible light communication message indicating the physical cell identifier of the second base station.

Aspect 7: The method of aspect 6, further comprising: performing a cell reselection procedure based at least in part on the broadcast visible light communication message indicating the physical cell identifier of the second base station; and establishing a radio resource control connection with the second base station based at least in part on performing the cell reselection procedure.

Aspect 8: The method of any of aspects 1 through 7, wherein receiving the indication that the base station supports visible light communications comprises: receiving, from the base station, system information or radio resource control signaling indicating visible light communication assistance information for broadcast visible light communication messages.

Aspect 9: The method of any of aspects 1 through 8, further comprising: transmitting, to the base station, a capability message indicating a capability of the UE to receive broadcast visible light communications, wherein receiving the visible light communication message is based at least in part on transmitting the capability message.

Aspect 10: The method of any of aspects 1 through 9, further comprising: receiving, from the base station and based at least in part on a capability of the UE to receive broadcast visible light communications, an indication of an extended discontinuous reception cycle for the UE.

Aspect 11: The method of aspect 10, wherein receiving the visible light communication message comprises: receiving a broadcast visible light communication message during an inactive duration of the extended discontinuous reception cycle, wherein activating the radio frequency receiver of the UE is based at least in part on receiving the broadcast visible light communication message during the inactive duration of the extended discontinuous reception cycle.

Aspect 12: The method of any of aspects 1 through 11, wherein communicating with the base station comprises: receiving a downlink data message from the base station using the radio frequency receiver.

Aspect 13: The method of any of aspects 1 through 12, wherein receiving the visible light communication message comprises: receiving the visible light communication message while the UE is in an idle state.

Aspect 14: A method for wireless communications at a base station, comprising: transmitting, to a UE, an indication that the base station supports visible light communications; transmitting, in accordance with the indication and via one or more light emitting diodes, a visible light communication message comprising a content that triggers activation of a radio frequency receiver at the UE; and communicating via radio frequency communications with the UE based at least in part on transmitting the visible light communication message.

Aspect 15: The method of aspect 14, wherein transmitting the visible light communication message comprises: transmitting, via the one or more light emitting diodes, a broadcast visible light communication message indicating a physical cell identifier of the base station, wherein communicating with the UE is based at least in part on the broadcast visible light communication message indicating the physical cell identifier of the base station.

Aspect 16: The method of any of aspects 14 through 15, further comprising: establishing a radio resource control connection with the UE based at least in part on the content of the visible light communication message, wherein communicating with the UE is based at least in part on establishing the radio resource control connection with the UE.

Aspect 17: The method of any of aspects 14 through 16, wherein transmitting the visible light communication message comprises: transmitting, via the one or more light emitting diodes, a broadcast visible light communication message indicating a system information value tag, wherein the system information value tag triggers activation of the radio frequency receiver at the UE.

Aspect 18: The method of any of aspects 14 through 17, wherein transmitting the visible light communication message comprises: transmitting, via the one or more light emitting diodes, the visible light communication message indicating an identifier of the UE, wherein the identifier of the UE triggers activation of the radio frequency receiver at the UE.

Aspect 19: The method of any of aspects 14 through 18, further comprising: identifying a paging message for the UE, wherein transmitting the visible light communication message is based at least in part on identifying the paging message.

Aspect 20: The method of any of aspects 14 through 19, wherein transmitting the indication that the base station supports visible light communications comprises: transmitting, to the UE, system information or radio resource control signaling indicating visible light communication assistance information for broadcast visible light communication messages.

Aspect 21: The method of any of aspects 14 through 20, further comprising: receiving, from the UE, a capability message indicating a capability of the UE to receive broadcast visible light communications, wherein transmitting the visible light communication message to the UE is based at least in part on receiving the capability message from the UE.

Aspect 22: The method of any of aspects 14 through 21, further comprising: transmitting, to the UE and based at least in part on a capability of the UE to receive broadcast visible light communications, an indication of an extended discontinuous reception cycle for the UE.

Aspect 23: The method of aspect 22, wherein transmitting the visible light communication message comprises: transmitting, to the UE and via the one or more light emitting diodes, the visible light communication message during an inactive duration of the extended discontinuous reception cycle.

Aspect 24: The method of any of aspects 14 through 23, wherein communicating with the UE comprises: transmitting a downlink data message to the UE based at least in part on transmitting the visible light communication message.

Aspect 25: An apparatus for wireless communications at a UE, comprising a processor; memory coupled with the processor; and instructions stored in the memory and executable by the processor to cause the apparatus to perform a method of any of aspects 1 through 13.

Aspect 26: An apparatus for wireless communications at a UE, comprising at least one means for performing a method of any of aspects 1 through 13.

Aspect 27: A non-transitory computer-readable medium storing code for wireless communications at a UE, the code comprising instructions executable by a processor to perform a method of any of aspects 1 through 13.

Aspect 28: An apparatus for wireless communications at a base station, comprising a processor; memory coupled with the processor; and instructions stored in the memory and executable by the processor to cause the apparatus to perform a method of any of aspects 14 through 24.

Aspect 29: An apparatus for wireless communications at a base station, comprising at least one means for performing a method of any of aspects 14 through 24.

Aspect 30: A non-transitory computer-readable medium storing code for wireless communications at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

at least one processor;

at least one memory coupled with the processor, with instructions stored in the at least one memory, the instructions being executable by the at least one processor, individually or in any combination, to cause the apparatus to:

receive, from a base station, an indication that the base station supports visible light communications;

receive, from the base station, system information or radio resource control signaling that indicates visible light communication assistance information for broadcast visible light communication messages;

deactivate a radio frequency receiver of the UE based at least in part on receiving the indication;

receive a visible light communication message at a photo detector of the UE;

activate the radio frequency receiver of the UE based at least in part on a content of the visible light communication message; and communicate with the base station using the radio frequency receiver.

2. The apparatus of claim 1, wherein the instructions to receive the visible light communication message are executable by the processor to cause the apparatus to:

receive a broadcast visible light communication message indicating a system information value tag, wherein activating the radio frequency receiver of the UE is based at least in part on the system information value tag.

3. The apparatus of claim 2, wherein the instructions are further executable by the processor to cause the apparatus to:

identify a change in system information for the base station based at least in part on the system information value tag, wherein activating the radio frequency receiver is based at least in part on identifying the change in system information.

4. The apparatus of claim 1, wherein the instructions to receive the visible light communication message are executable by the processor to cause the apparatus to:

receive the visible light communication message indicating an identifier of the UE, wherein activating the radio frequency receiver is based at least in part on the visible light communication message indicating the identifier of the UE.

5. The apparatus of claim 4, wherein the instructions are further executable by the processor to cause the apparatus to:

identify an incoming voice call for the UE based at least in part on the visible light communication message indicating the identifier of the UE, wherein activating the radio frequency receiver is based at least in part on identifying the incoming voice call.

6. The apparatus of claim 1, wherein the instructions to receive the visible light communication message are executable by the processor to cause the apparatus to:

receive, from a second base station, a broadcast visible light communication message indicating a physical cell identifier of the second base station, wherein activating the radio frequency receiver of the UE is based at least in part on the broadcast visible light communication message indicating the physical cell identifier of the second base station.

7. The apparatus of claim 6, wherein the instructions are further executable by the processor to cause the apparatus to:

perform a cell reselection procedure based at least in part on the broadcast visible light communication message indicating the physical cell identifier of the second base station; and establish a radio resource control connection with the second base station based at least in part on performing the cell reselection procedure.

8. The apparatus of claim 1, wherein the instructions are further executable by the processor to cause the apparatus to:

transmit, to the base station, a capability message indicating a capability of the UE to receive broadcast visible light communications, wherein receiving the visible light communication message is based at least in part on transmitting the capability message.

9. The apparatus of claim 1, wherein the instructions are further executable by the processor to cause the apparatus to:

receive, from the base station and based at least in part on a capability of the UE to receive broadcast visible light communications, an indication of an extended discontinuous reception cycle for the UE.

10. The apparatus of claim 9, wherein the instructions to receive the visible light communication message are executable by the processor to cause the apparatus to:

receive a broadcast visible light communication message during an inactive duration of the extended discontinuous reception cycle, wherein activating the radio frequency receiver of the UE is based at least in part on receiving the broadcast visible light communication message during the inactive duration of the extended discontinuous reception cycle.

11. The apparatus of claim 1, wherein the instructions to communicate with the base station are executable by the processor to cause the apparatus to:

receive a downlink data message from the base station using the radio frequency receiver.

12. The apparatus of claim 1, wherein the instructions to receive the visible light communication message are executable by the processor to cause the apparatus to:

receive the visible light communication message while the UE is in an idle state.

13. An apparatus for wireless communications at a base station, comprising:

at least one processor;

at least one memory coupled with the at least one processor, with instructions stored in the at least one memory, the instructions being executable by the at least one processor, individually or in any combination, to cause the apparatus to:

transmit, to a user equipment (UE), an indication that the base station supports visible light communications;

transmit, to the UE, system information or radio resource control signaling that indicates visible light communication assistance information for broadcast visible light communication messages;

transmit, in accordance with the indication and via one or more light emitting diodes, a visible light communication message comprising a content that triggers activation of a radio frequency receiver at the UE; and communicate via radio frequency communications with the UE based at least in part on transmitting the visible light communication message.

14. The apparatus of claim 13, wherein the instructions to transmit the visible light communication message are executable by the processor to cause the apparatus to:

transmit, via the one or more light emitting diodes, a broadcast visible light communication message indicating a physical cell identifier of the base station, wherein communicating via the radio frequency communications with the UE is based at least in part on the broadcast visible light communication message indicating the physical cell identifier of the base station.

15. The apparatus of claim 13, wherein the instructions are further executable by the processor to cause the apparatus to:

establish a radio resource control connection with the UE based at least in part on the content of the visible light communication message, wherein communicating via the radio frequency communications with the UE is based at least in part on establishing the radio resource control connection with the UE.

16. The apparatus of claim 13, wherein the instructions to transmit the visible light communication message are executable by the processor to cause the apparatus to:

transmit, via the one or more light emitting diodes, a broadcast visible light communication message indicating a system information value tag, wherein the system information value tag triggers activation of the radio frequency receiver at the UE.

17. The apparatus of claim 13, wherein the instructions to transmit the visible light communication message are executable by the processor to cause the apparatus to:

transmit, via the one or more light emitting diodes, the visible light communication message indicating an identifier of the UE, wherein the identifier of the UE triggers activation of the radio frequency receiver at the UE.

18. The apparatus of claim 13, wherein the instructions are further executable by the processor to cause the apparatus to:

identify a paging message for the UE, wherein transmitting the visible light communication message is based at least in part on identifying the paging message.

19. The apparatus of claim 13, wherein the instructions are further executable by the processor to cause the apparatus to:

receive, from the UE, a capability message indicating a capability of the UE to receive broadcast visible light communications, wherein transmitting the visible light communication message to the UE is based at least in part on receiving the capability message from the UE.

20. The apparatus of claim 13, wherein the instructions are further executable by the processor to cause the apparatus to:

transmit, to the UE and based at least in part on a capability of the UE to receive broadcast visible light communications, an indication of an extended discontinuous reception cycle for the UE.

21. The apparatus of claim 20, wherein the instructions to transmit the visible light communication message are executable by the processor to cause the apparatus to:

transmit, to the UE and via the one or more light emitting diodes, the visible light communication message during an inactive duration of the extended discontinuous reception cycle.

22. The apparatus of claim 13, wherein the instructions to communicate via the radio frequency communications with the UE are executable by the processor to cause the apparatus to:

transmit a downlink data message to the UE based at least in part on transmitting the visible light communication message.

23. A method for wireless communications at a user equipment (UE), comprising:

receiving, from a base station, an indication that the base station supports visible light communications;

receiving, from the base station, system information or radio resource control signaling that indicates visible light communication assistance information for broadcast visible light communication messages;

deactivating a radio frequency receiver of the UE based at least in part on receiving the indication;

receiving a visible light communication message at a photo detector of the UE;

activating the radio frequency receiver of the UE based at least in part on a content of the visible light communication message; and communicating with the base station using the radio frequency receiver.

24. The method of claim 23, wherein receiving the visible light communication message comprises:

receiving a broadcast visible light communication message indicating a system information value tag, wherein activating the radio frequency receiver of the UE is based at least in part on the system information value tag.

25. The method of claim 23, wherein receiving the visible light communication message comprises:

receiving the visible light communication message indicating an identifier of the UE, wherein activating the radio frequency receiver is based at least in part on the visible light communication message indicating the identifier of the UE.

26. The method of claim 23, wherein receiving the visible light communication message comprises:

receiving, from a second base station, a broadcast visible light communication message indicating a physical cell identifier of the second base station, wherein activating the radio frequency receiver of the UE is based at least in part on the broadcast visible light communication message indicating the physical cell identifier of the second base station.

27. A method for wireless communications at a base station, comprising:

transmitting, to a user equipment (UE), an indication that the base station supports visible light communications;

transmitting, to the UE, system information or radio resource control signaling that indicates visible light communication assistance information for broadcast visible light communication messages;

transmitting, in accordance with the indication and via one or more light emitting diodes, a visible light communication message comprising a content that triggers activation of a radio frequency receiver at the UE; and communicating via radio frequency communications with the UE based at least in part on transmitting the visible light communication message.

* * * * *